（12）United States Patent
Moon et al.

（10）Patent No.: US 10,359,862 B2
（45）Date of Patent: Jul. 23, 2019

（54） MOBILE TERMINAL AND METHOD FOR CONTROLLING THE SAME

（71） Applicant: LG ELECTRONICS INC., Seoul (KR)

（72） Inventors: Beomsuk Moon, Seoul (KR); Minhyeok Kim, Seoul (KR); Yusol Ha, Seoul (KR)

（73） Assignee: LG ELECTRONICS INC., Seoul (KR)

（*） Notice: Subject to any disclaimer, the term of this patent is extended or adjusted under 35 U.S.C. 154(b) by 177 days.

（21） Appl. No.: 15/651,239

（22） Filed: Jul. 17, 2017

（65） Prior Publication Data

US 2018/0246565 A1    Aug. 30, 2018

（30） Foreign Application Priority Data

Feb. 28, 2017   (KR) .................. 10-2017-0026281

（51） Int. Cl.
| | |
|---|---|
| *G06F 3/01* | (2006.01) |
| *G06F 3/0487* | (2013.01) |
| *G06F 3/0484* | (2013.01) |
| *G06K 9/00* | (2006.01) |
| *G06F 3/038* | (2013.01) |
| *G06F 3/0346* | (2013.01) |

（52） U.S. Cl.
CPC ............ *G06F 3/0346* (2013.01); *G06F 3/012* (2013.01); *G06F 3/016* (2013.01); *G06F 3/017* (2013.01); *G06F 3/038* (2013.01); *G06F 3/0487* (2013.01); *G06F 3/04845* (2013.01); *G06K 9/00335* (2013.01)

（58） Field of Classification Search
CPC ........................................... G06F 3/017
See application file for complete search history.

（56） References Cited

U.S. PATENT DOCUMENTS

| 8,253,760 | B2 * | 8/2012 | Sako | G02B 27/0172 |
| | | | | 345/629 |
| 8,982,013 | B2 * | 3/2015 | Sako | G02B 27/017 |
| | | | | 345/156 |
| 9,665,167 | B2 * | 5/2017 | Sako | G02B 27/0172 |
| 9,772,686 | B2 * | 9/2017 | Sako | G02B 27/0172 |
| 9,946,393 | B2 * | 4/2018 | Kim | G06F 3/012 |
| 2008/0088646 | A1 * | 4/2008 | Sako | G02B 27/0172 |
| | | | | 345/647 |
| 2012/0300061 | A1 * | 11/2012 | Osman | G06F 1/3231 |
| | | | | 348/135 |
| 2015/0347080 | A1 * | 12/2015 | Shin | G09G 3/001 |
| | | | | 345/173 |

(Continued)

OTHER PUBLICATIONS

Android Headlines, HTC Vive UI Walkthrough, Tips and Tricks, Apr. 7, 2016; https://www.youtube.com/watch?v=tpeW-IxccK0.*

(Continued)

*Primary Examiner* — Patrick F Marinelli
（74）*Attorney, Agent, or Firm* — Lee, Hong, Degerman, Kang & Waimey

（57）   ABSTRACT

The present invention relates to a system including a head mounted display, which is able to freely use a screen configured to output external environment while using virtual reality content using the head mounted display, and a method of controlling therefor.

19 Claims, 18 Drawing Sheets

(56) References Cited

U.S. PATENT DOCUMENTS

| | | | |
|---|---|---|---|
| 2016/0054565 A1* | 2/2016 | Izumihara | G09G 5/00 |
| | | | 345/8 |
| 2016/0055680 A1* | 2/2016 | Kim | G06F 3/012 |
| | | | 345/633 |
| 2016/0132189 A1* | 5/2016 | Choi | G06F 3/0481 |
| | | | 345/633 |
| 2016/0282938 A1* | 9/2016 | Sako | G02B 27/0172 |
| 2017/0097675 A9* | 4/2017 | Sako | G02B 27/0172 |
| 2017/0102767 A1* | 4/2017 | Kim | G06F 3/013 |
| 2017/0214782 A1* | 7/2017 | Brinda | G06F 3/012 |
| 2017/0249019 A1* | 8/2017 | Sawyer | G06F 3/038 |
| 2017/0322622 A1* | 11/2017 | Hong | G06F 3/012 |
| 2018/0070122 A1* | 3/2018 | Baek | G09G 5/003 |
| 2018/0101247 A1* | 4/2018 | Lee | G06F 3/0346 |

OTHER PUBLICATIONS

HTC, Vive PRE User Guide, 2016; https://www.htc.com/managed-assets/shared/desktop/vive/Vive_PRE_User_Guide.pdf.*

* cited by examiner

FIG. 4
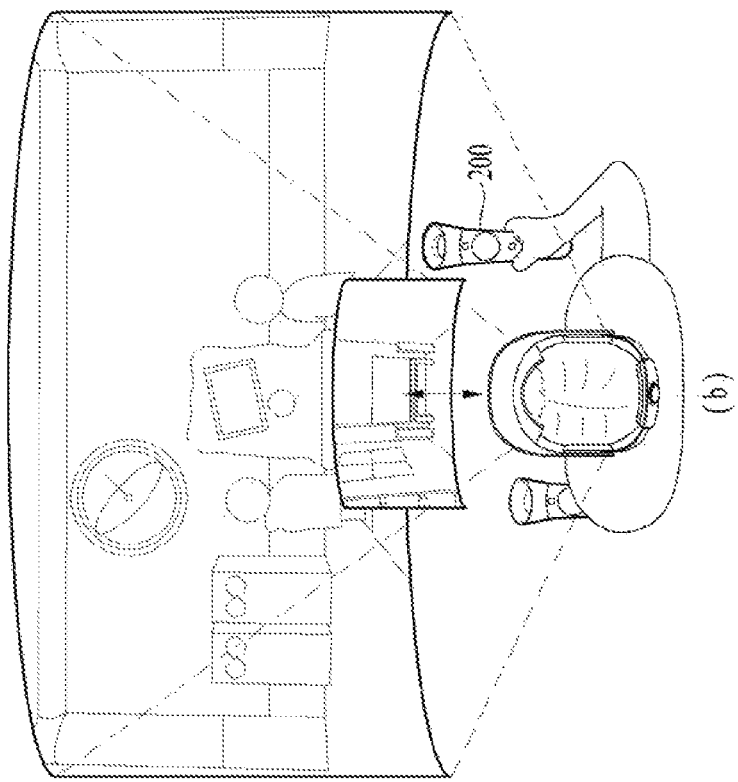
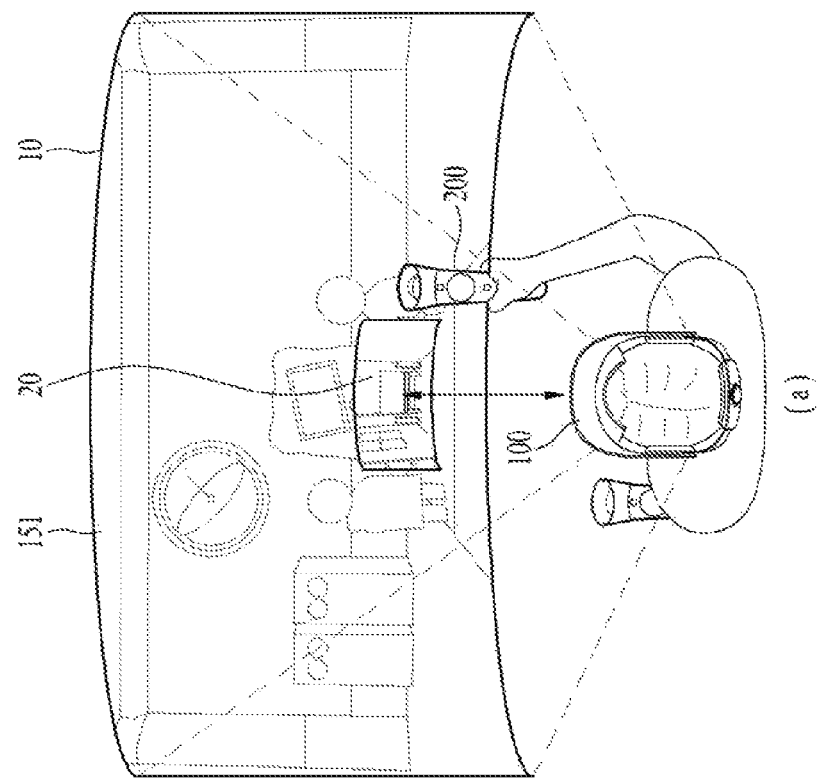

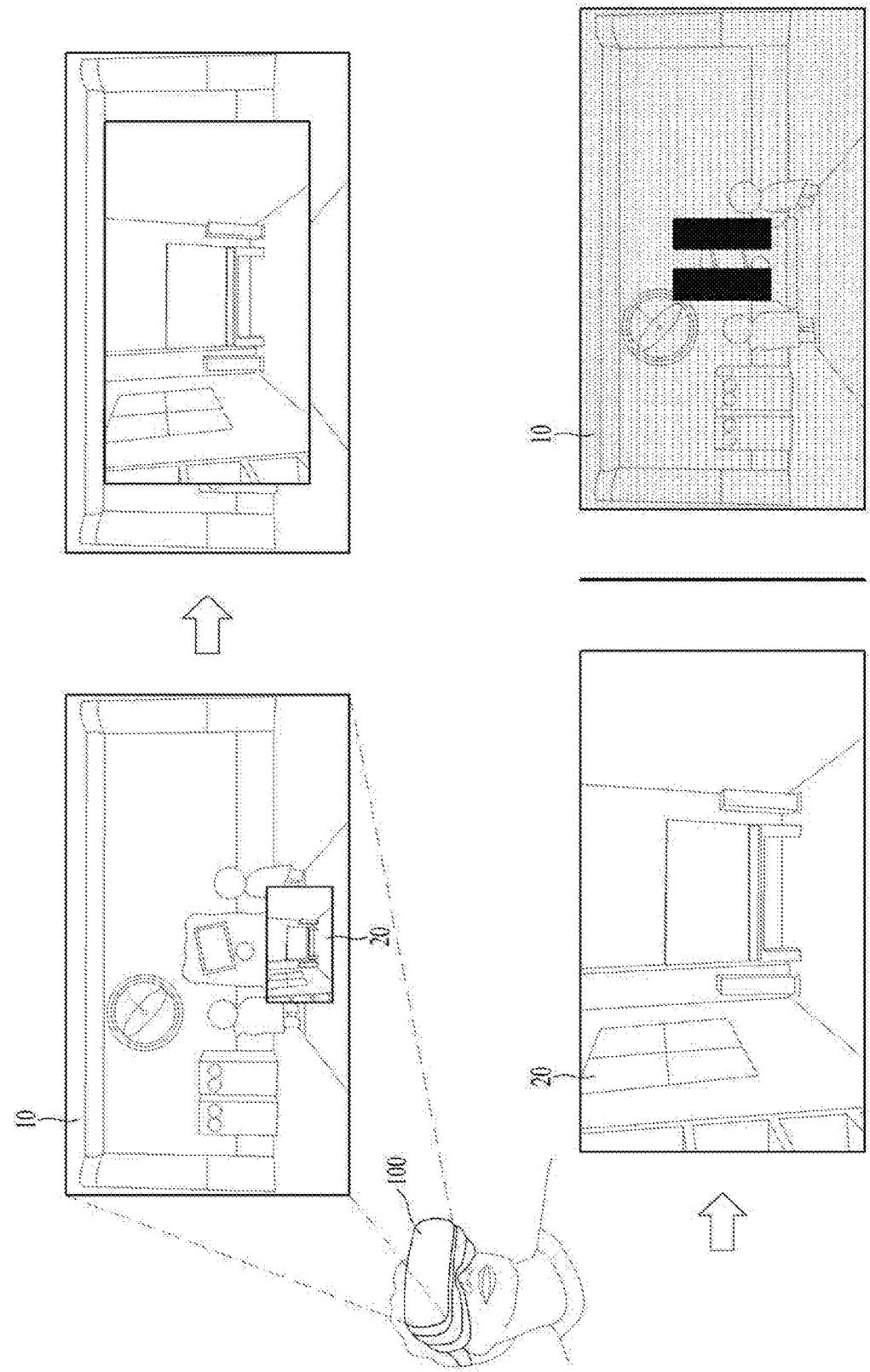

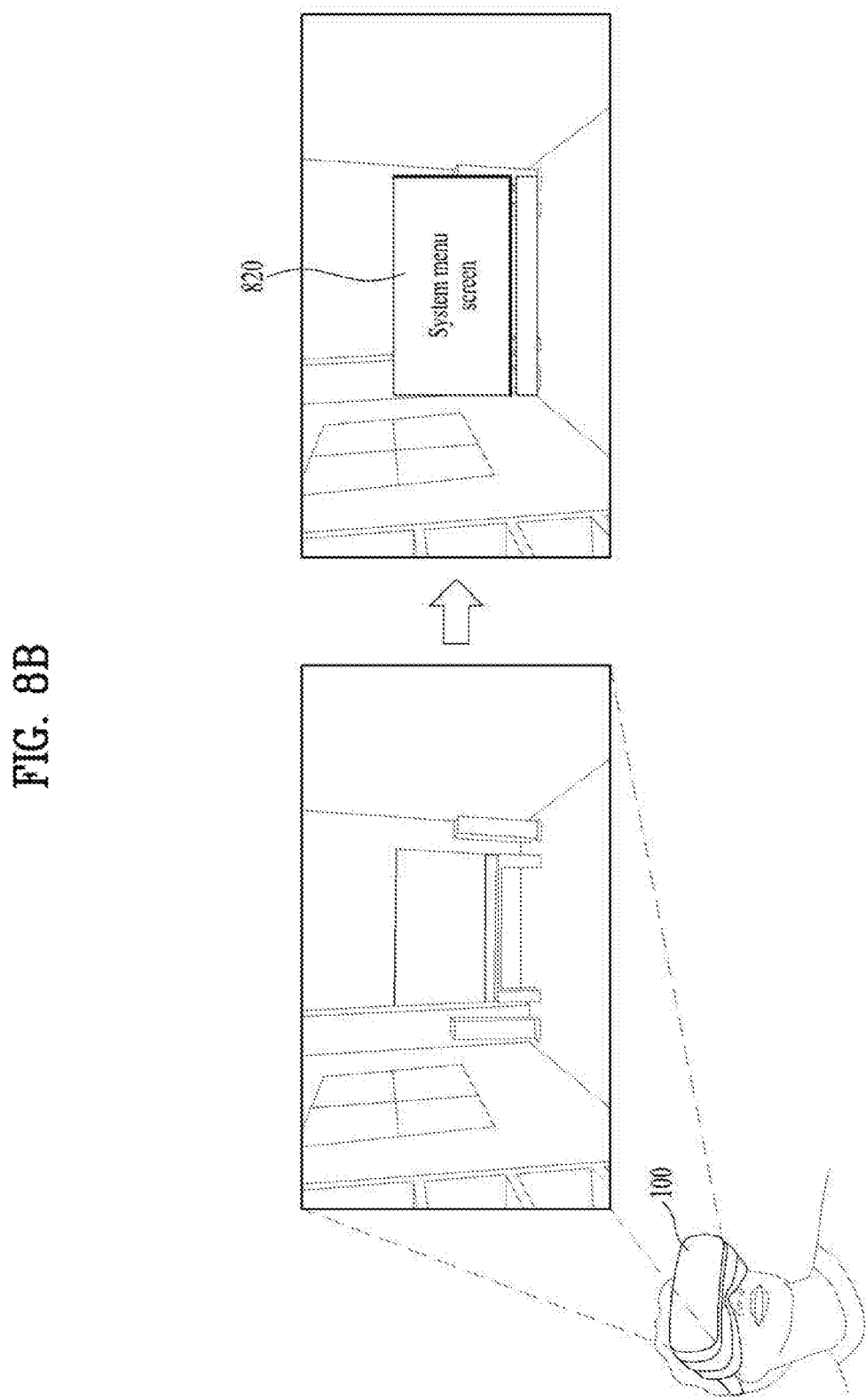

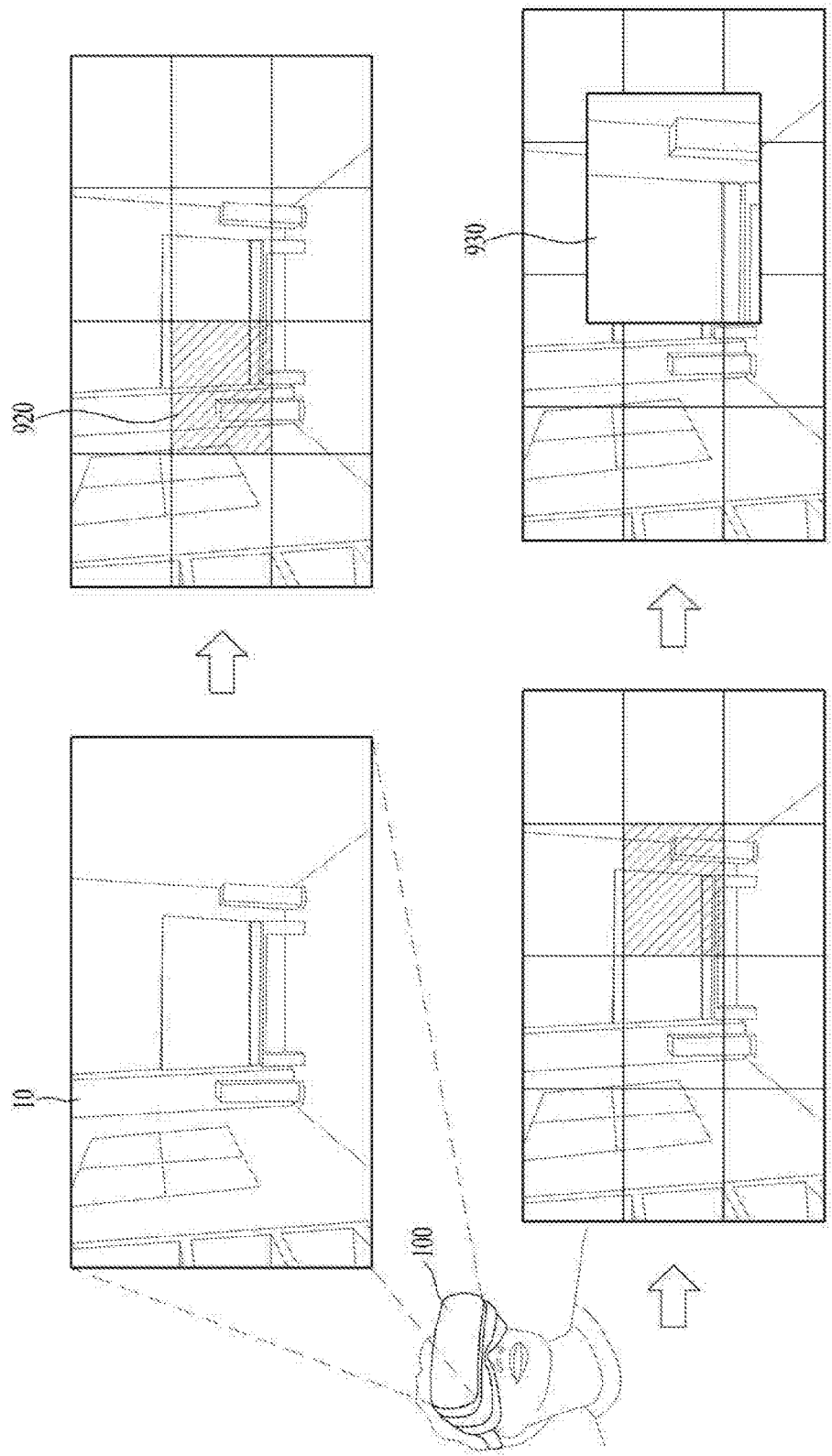

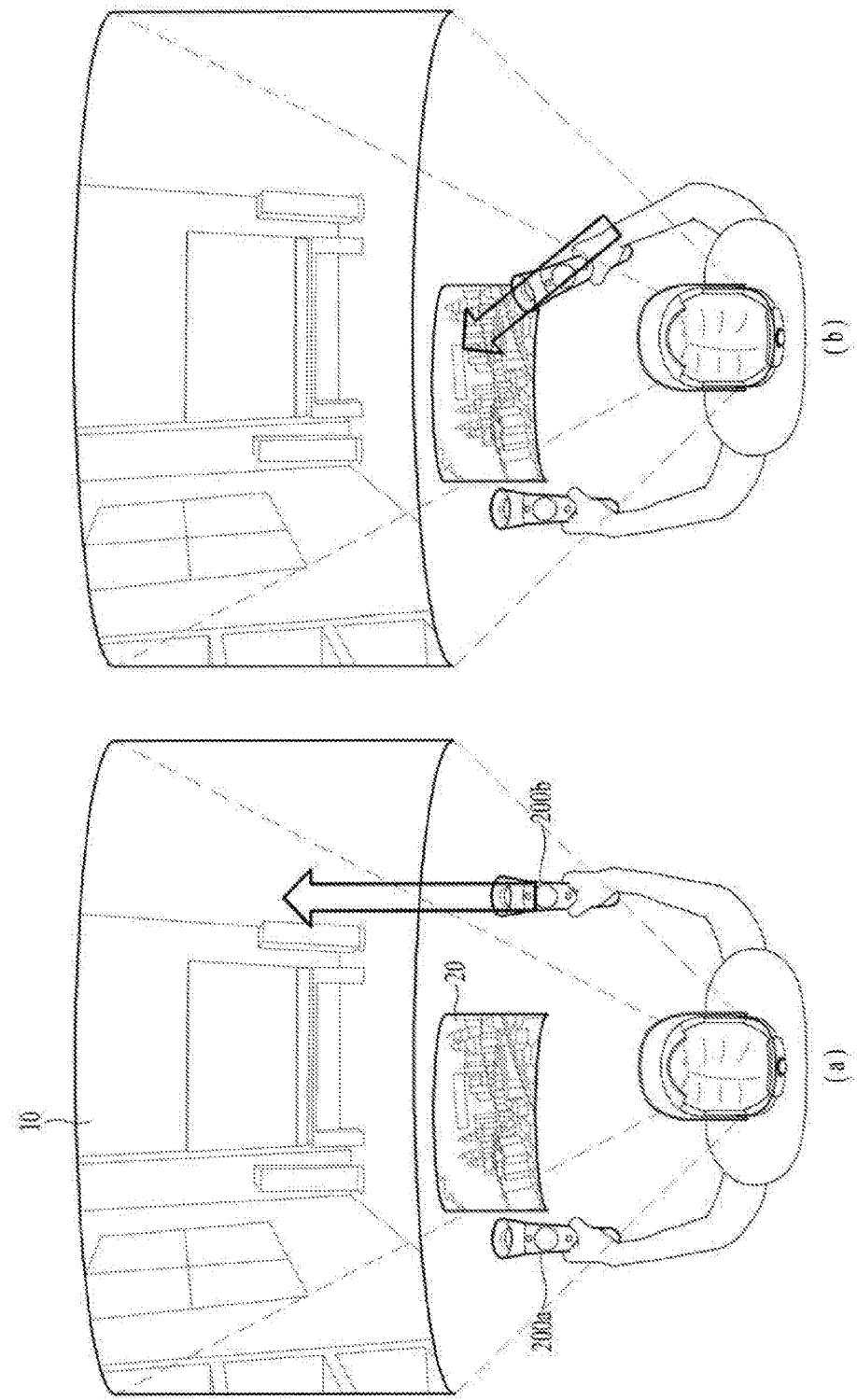

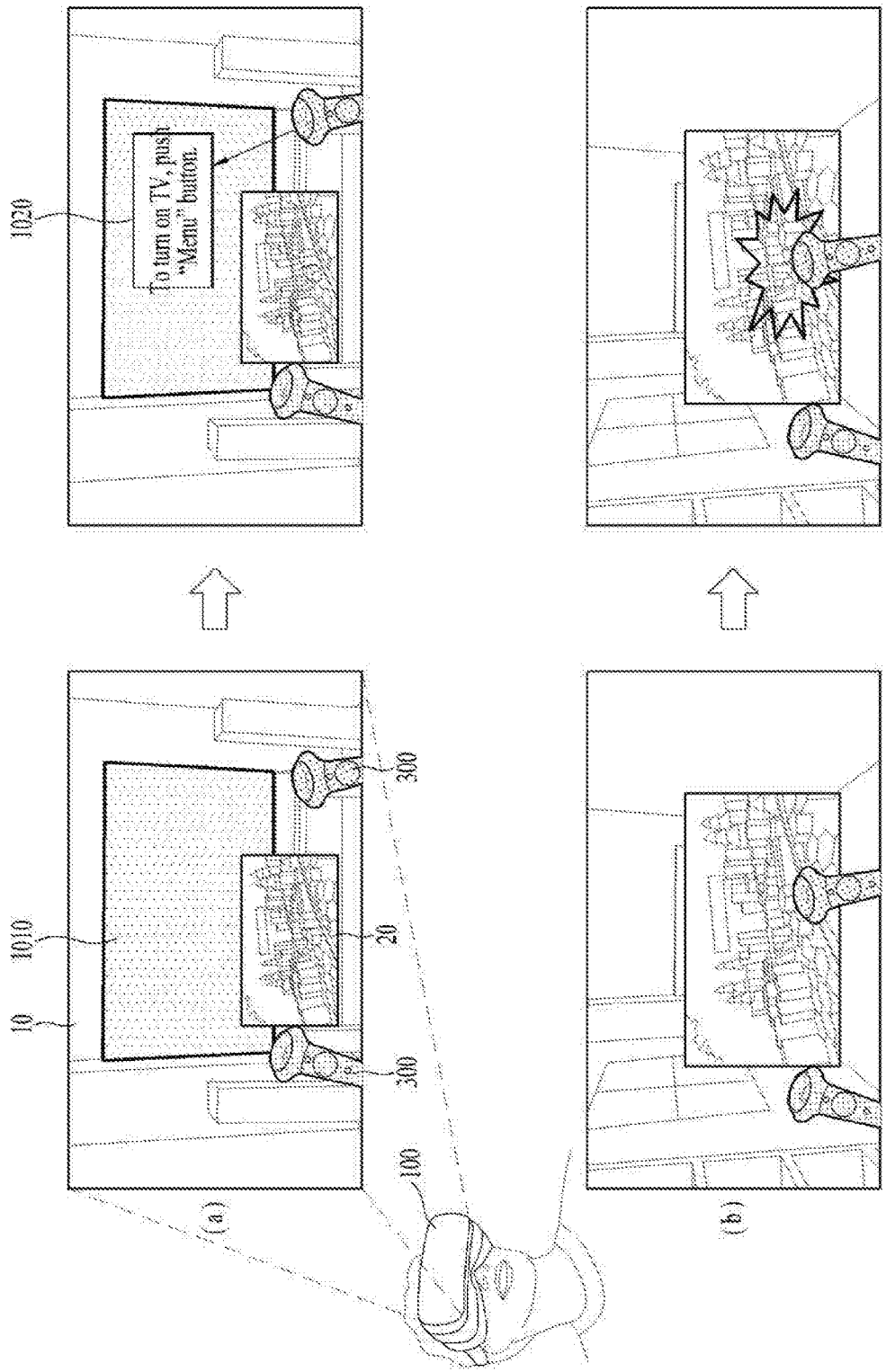

MOBILE TERMINAL AND METHOD FOR CONTROLLING THE SAME

CROSS-REFERENCE TO RELATED APPLICATIONS

Pursuant to 35 U.S.C. § 119 (a), this application claims the benefit of earlier filing date and right of priority to Korean Application No. 10-2017-0026281, filed on Feb. 28, 2017, the contents of which are hereby incorporated by reference herein in its entirety.

BACKGROUND OF THE INVENTION

Field of the Invention

The present invention relates to a system including a head mounted display, which is able to freely use a screen configured to output external environment while using virtual reality content using the head mounted display, and a method of controlling therefor.

Discussion of the Related Art

VR (Virtual Reality) corresponds to an interface for making a specific environment or a situation using a computer and enabling a user using the environment or the situation to feel like interacting with an actual surrounding environment or environment.

A HMD (Head Mounted Display) corresponds to various image display devices that makes a user watch images (contents) in a manner of being worn on a head of the user like glasses. As digital devices tend to be downsized and lightened, various wearable computers are developing and the HMD is widely using. The HMD can provide various conveniences to a user in a manner of being combined not only with a simple display function but also with an augmented reality technique, an N screen technique, and the like.

Meanwhile, in order to provide realistic VR environment to a user, it may be able to provide the user with not only a HMD but also an external controller connected with the HMD. In this case, it may be able to control VR content outputted on the HMD according to a movement of the external controller. Yet, if a camera is mounted on the exterior of the HMD, the HMD may output an image sensed by the camera irrespective of the movement of the external controller. As a result, the image can be confusing the user.

SUMMARY OF THE INVENTION

Accordingly, an object of the present invention is to address the above-noted and other problems. Another object of the present invention is to provide a system including a head mounted display (HMD) capable of not only checking external environment via an external camera mounted on the HMD but also controlling a screen related to the external environment and a method of controlling therefor.

The other object of the present invention is to provide a system including a head mounted display (HMD) capable of controlling both an external image and VR content via an external controller connected with the HMD and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a HMD (head mounted display) system includes at least one external controller including a wireless communication unit configured to transceive data with a HMD and a sensing unit configured to detect a movement of the at least one external controller, and the HMD including a display unit, a camera, a wireless communication unit configured to transceive data with the at least one external controller, and a controller configured to output VR (virtual reality) content on a first screen of the display unit, the controller configured to output an external image sensed by the camera on a second screen, the controller configured to receive first movement information from the at least one external controller via the wireless communication unit, the controller configured to output the external image outputted on the second screen on the first screen by switching between the screens based on the first movement information.

According to a different embodiment of the present invention, the controller can output the VR content outputted on the first screen on the second screen based on the first movement information.

According to a different embodiment of the present invention, the first movement information indicates that the at least one external controller is positioned at a screen switching area.

According to a different embodiment of the present invention, the controller can receive second movement information from the at least one external controller via the wireless communication unit. In this case, the second movement information may correspond to information indicating that the at least one external controller moves in a first direction after being positioned at the screen switching area. The controller can maintain a state of outputting the external image on the first screen based on the second movement information.

According to a different embodiment of the present invention, the controller can receive third movement information from the at least one external controller via the wireless communication unit. In this case, the third movement information may correspond to information indicating that the at least one external controller moves in a second direction after being positioned at the screen switching area. The controller can output the VR content again on the first screen based on the third movement information.

According to a different embodiment of the present invention, the controller can receive fourth movement information from the at least one external controller via the wireless communication unit and control at least one of the VR content and the external image based on the fourth movement information.

According to a different embodiment of the present invention, the fourth movement information may include direction information indicating that the at least one external controller is facing the first screen or the second screen.

According to a different embodiment of the present invention, the wireless communication unit transceives data with at least one external device. If the at least one external controller is facing the first screen, the controller can control the at least one external device based on the fourth movement information.

According to a different embodiment of the present invention, the at least one external controller can include a first external controller and a second external controller.

According to a different embodiment of the present invention, the controller can map a first external controller to control the VR content and map a second external controller to control the external image.

According to a different embodiment of the present invention, the controller can output the second screen at one side of an object corresponding to the at least one external controller outputted on the display unit.

According to a different embodiment of the present invention, the controller can output a real time external image sensed by the camera on the second screen.

According to a different embodiment of the present invention, the controller can perform a pairing with the at least one external controller via the wireless communication unit.

According to a different embodiment of the present invention, the controller can receive fifth movement information from the at least one external controller via the wireless communication unit and change and output at least one selected from the group consisting of a size, a position, and a form of the second screen on which the external image is outputted based on the fifth movement information.

According to a different embodiment of the present invention, if the fifth movement information indicates that a distance between the at least one external controller and the HMD is decreasing, the controller can output the second screen by magnifying the size of the second screen. If the fifth movement information indicates that the distance between the at least one external controller and the HMD is increasing, the controller can output the second screen by reducing the size of the second screen.

According to a different embodiment of the present invention, an angle of view of an external image outputted on the second screen can be uniformly maintained.

According to a different embodiment of the present invention, a size of the first screen is greater than a size of the second screen.

According to a different embodiment of the present invention, the second screen is outputted in a manner of being overlaid on the first screen and the second screen can be outputted at a closer distance compared to the first screen on the basis of the HMD.

To further achieve these objects and other advantages and in accordance with the purpose of the invention, as embodied and broadly described herein, according to a different embodiment, a head mounted display (HMD) includes a display unit, a camera, a wireless communication unit configured to transceive data with at least one external controller, and a controller, the controller configured to output VR (virtual reality) content on a first screen of the display unit, the controller configured to output an external image sensed by the camera on a second screen, the controller configured to receive first movement information from the at least one external controller via the wireless communication unit, the controller configured to output the external image outputted on the second screen on the first screen by switching between the screens based on the first movement information.

To further achieve these objects and other advantages and in accordance with the purpose of the invention, as embodied and broadly described herein, according to a further different embodiment, a method of controlling a HMD system including a HMD (head mounted display) and at least one external controller, includes the steps of outputting VR (virtual reality) content on a first screen of a display unit of the HMD and outputting an external image sensed by a camera on a second screen, sensing a movement via a sensing unit of the at least one external controller and transmitting sensed first movement information to the HMD via a wireless communication unit of the at least one external controller, receiving the first movement information from the at least one external controller via a wireless communication unit of the HMD, and outputting the external image outputted on the second screen of the HMD on the first screen by switching between the screens based on the first movement information.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 4 is a diagram for a method of controlling a size or a position of a second screen in a HMD system according to one embodiment of the present invention;

FIGS. 7A and 7B are diagrams for an example of switching a first screen and a second screen according to a movement of an external controller in a HMD system according to one embodiment of the present invention;

FIGS. 8A and 8B are diagrams for an example of controlling an external image which is switched according to a movement of an external controller in a HMD system according to one embodiment of the present invention;

FIGS. 9A, 9B, 9C, and 9D are diagrams for an example of matching each of a plurality of external controllers to a first screen and a second screen in a HMD system according to one embodiment of the present invention;

FIGS. 10A and 10B are diagrams for an example of controlling a first screen and a second screen according to a movement of an external controller in a HMD system according to one embodiment of the present invention;

DETAILED DESCRIPTION OF THE INVENTION

Figure 1:
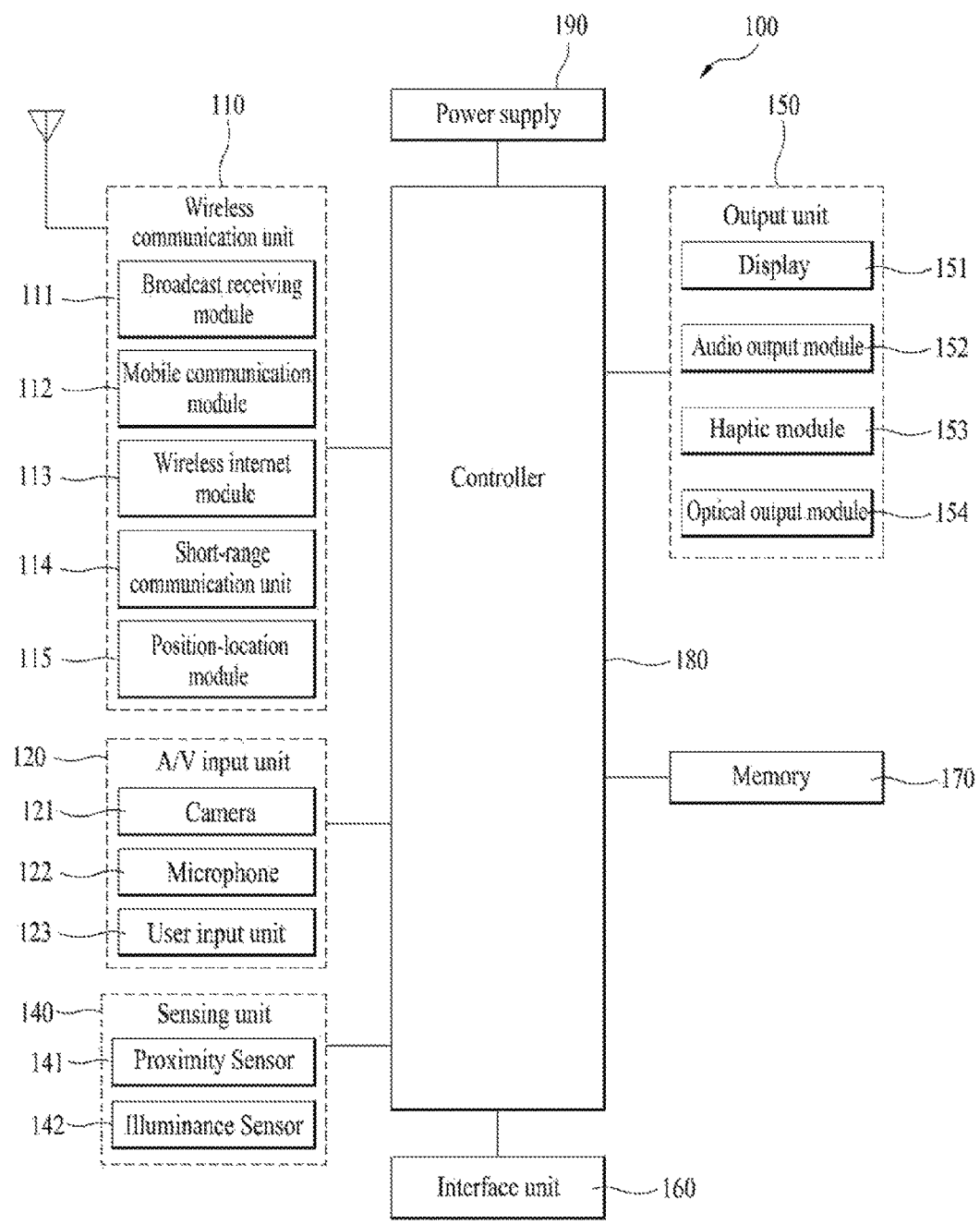
FIG. 1 is a block diagram for explaining a HMD in accordance with the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A HMD described in the present specification can include a wearable device (e.g., a glass-type terminal (smart glass)), and the like.

HMDs presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of HMDs. However, such teachings apply equally to other types of terminals, such as those types noted above. In addition, these teachings may also be applied to stationary terminals such as digital TV, desktop computers, and the like.

FIG. 1 is a block diagram for explaining a HMD in accordance with the present invention.

The HMD 100 is shown having components such as a wireless communication unit 110, an A/V input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1, the HMD 100 is shown having wireless communication unit 110 configured with several commonly implemented components.

The wireless communication unit 110 typically includes one or more modules which permit communications such as wireless communications between the HMD 100 and a wireless communication system, communications between the HMD 100 and another HMD, communications between the HMD 100 and an external server. Further, the wireless communication unit 110 typically includes one or more modules which connect the HMD 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the HMD, the surrounding environment of the HMD, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The HMD 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the HMD 100 and a user, as well as function as the user input unit 123 which provides an input interface between the HMD 100 and the user.

The interface unit 160 serves as an interface with various types of external devices that can be coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). It is common for application programs to be stored in the memory 170, installed in the HMD 100, and executed by the controller 180 to perform an operation (or function) for the HMD 100.

The controller 180 typically functions to control overall operation of the HMD 100, in addition to the operations associated with the application programs. The controller 180 can provide or process information or a function appropriate for a user in a manner of processing a signal, data, information and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least a part of the configuration elements can operate in a manner of cooperating with each other to implement an operation of a HMD, control of the HMD or a method of controlling the HMD according to various embodiments described in the following. And, the operation of the HMD, the control of the HMD or the method of controlling the HMD can be implemented on the HMD by driving at least one or more application programs stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the HMD. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the HMD 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the HMD 100 and a wireless communication system, communications between the HMD 100 and another HMD 100, or communications between the HMD and a network where another HMD 100 (or an external server) is located, via wireless area networks. One example of the wireless area networks is a wireless personal area networks.

In some embodiments, another mobile terminal (which may be configured similarly to HMD 100) may be a wearable device, for example, a smart watch, a smart glass or a head mounted display (HMD), which is able to exchange data with the HMD 100 (or otherwise cooperate with the HMD 100). The short-range communication module 114 may sense or recognize the wearable device, and permit communication between the wearable device and the HMD 100. In addition, when the sensed wearable device is a device which is authenticated to communicate with the HMD 100, the controller 180, for example, may cause transmission of data processed in the HMD 100 to the wearable device via the short-range communication module 114. Hence, a user of the wearable device may use the data processed in the HMD 100 on the wearable device. For example, when a call is received in the HMD 100, the user may answer the call using the wearable device. Also, when a message is received in the HMD 100, the user can check the received message using the wearable device.

The position-location or location information module 115 is generally configured to detect, calculate, derive or otherwise identify a position of the HMD. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the HMD. As one example, when the HMD uses a GPS module, a position of the HMD may be acquired using a signal sent from a GPS satellite. As another example, when the HMD uses the Wi-Fi module, a position of the HMD can be acquired based on information related to a wireless access point (AP) which transmits or receives a wireless signal to or from the Wi-Fi module.

The input unit 120 may be configured to permit various types of input to the HMD 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the HMD 100. As another example, the cameras 121 may be located in a stereoscopic arrangement to acquire left and right images for implementing a stereoscopic image.

The microphone 122 is generally implemented to permit audio input to the HMD 100. The audio input can be processed in various manners according to a function being executed in the HMD 100. If desired, the microphone 122 may include assorted noise removing algorithms to remove unwanted noise generated in the course of receiving the external audio.

The user input unit 123 is a component that permits input by a user. Such user input may enable the controller 180 to control operation of the HMD 100. The user input unit 123 may include one or more of a mechanical input element (for example, a key, a button located on a front and/or rear surface or a side surface of the HMD 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the HMD at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the HMD, surrounding environment information of the HMD, user information, or the like. The controller 180 generally cooperates with the sending unit 140 to control operation of the HMD 100 or execute data processing, a function or an operation associated with an application program installed in the HMD based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the HMD 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the HMD 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the HMD 100.

An optical output module 154 can output a signal for indicating an event generation using light of a light source. Examples of events generated in the HMD 100 may include message reception, call signal reception, a missed call, an alarm, a schedule notice, an email reception, information reception through an application, and the like.

A signal output by the optical output module 154 may be implemented in such a manner that the HMD emits monochromatic light or light with a plurality of colors. The signal output may be terminated as the HMD senses that a user has checked the generated event, for example.

The interface unit 160 serves as an interface for external devices to be connected with the HMD 100. For example, the interface unit 160 can receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 can serve as a passage to allow power from the cradle to be supplied to the HMD 100 or may serve as a passage to allow various command signals input by the user from the cradle to be transferred to the HMD there through. Various command signals or power input from the cradle may operate as signals for recognizing that the HMD is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

The controller 180 may typically control the general operations of the HMD 100. For example, the controller 180 may set or release a lock state for restricting a user from inputting a control command with respect to applications when a status of the HMD meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the HMD 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Further preferred embodiments will be described in more detail with reference to additional drawing figures. It is understood by those skilled in the art that the present features can be embodied in several forms without departing from the characteristics thereof.

Figure 2:
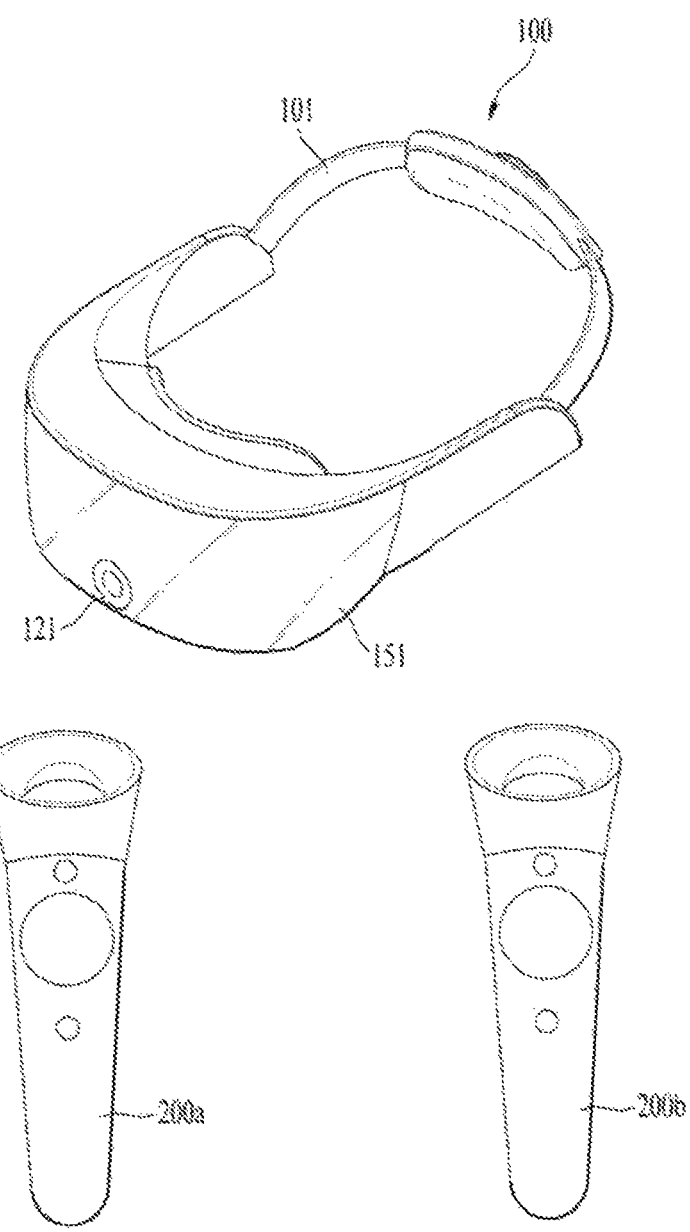
FIG. 2 is a diagram for a HMD and a plurality of controllers according to one embodiment of the present invention.

FIG. 2 is a diagram for a HMD and a plurality of controllers according to one embodiment of the present invention.

Referring to FIG. 2, the HMD 100 according to the present invention is configured to be worn on a head part (head, face) of a body and can include a frame unit 101

(case, housing, cover, etc.). The frame unit 101 can be made of a flexible material to make a user easily wear the HMD.

The frame unit can be referred to as a main body (or, HMD main body) or a body (or, HMD body). In this case, the HMD main body (or, HMD body) can be comprehended as a concept indicating the HMD 100 as at least one assembly.

The frame unit is mounted on a head part and can arrange a space in which various parts are installed. Such an electronic part as a display unit 151, a camera 121, a controller, a sensing unit, a wireless communication unit, and the like can be installed in the frame unit 101. In this case, the display unit 151 can be configured to cover at least one of a left eye and a right eye of a user (or, to face at least one of a left eye and a right eye of a user) and can be configured to be removable.

The controller 180 is configured to control various electronic parts mounted on the HMD 100. The controller 180 can be comprehended as a configuration corresponding to the controller 180 mentioned earlier in FIG. 1.

The display unit 151 is installed in the frame unit 101 and plays a role in outputting screen information (e.g., a picture, an image, a video, etc.) in the front of eyes of a user. The display unit 151 can be deployed in accordance with at least one of a left eye and a right eye to display the screen information in the front of the eyes of the user when the user wears the HMD 100. According to one embodiment of the present invention, in order to output an image to both the left eye and the right eye of the user, the display unit 151 can be positioned at a place capable of covering both the left eye and the right eye.

And, the display unit 151 can project an image to the eyes of the user using a prism. And, the prism can be made of a transparent material to make the user watch both the projected image and a general field of vision (a range of vision seen through the eyes of the user).

As mentioned in the foregoing description, an image outputted via the display unit 151 can be seen in a manner of being overlapped with a general field of vision. The HMD 100 can provide a user with AR (Augmented Reality) that provides one image in a manner of overlapping a real image or a background with a virtual image using the above mentioned display characteristic.

The display unit 151 of the HMD according to the present invention can be positioned at the inside of a main body. Specifically, when the HMD is worn on a head part of a user, the display unit 151 can be positioned at a place capable of facing eyes of the user at the inside of the HMD.

The camera 121 is installed in the vicinity of at least one of a left eye and a right eye and is configured to capture a front viewing angle area. Since the camera 121 is configured to face the front direction in a manner of being installed in the vicinity of the eyes, the camera 121 can obtain a scene at which a user is facing as an image.

And, the HMD according to one embodiment of the present invention can obtain a captured image of at least one object located at the outside of the HMD. For example, the camera 121 may correspond to a camera having a predetermined angle of view (field of view). And, the camera 121 can capture a predetermined object included in a specific area located at the outside of the HMD. In this case, the predetermined object may correspond to an identification target of all types that forms specific information. The present drawing illustrates an example that a single camera 121 is installed, by which the present invention may be non-limited. For example, a plurality of cameras 121 can be installed to obtain a 3D image. And, the controller 180 captures an object included in a predetermined angle of view using the camera 121 and can control the captured image to be outputted on the display unit 151.

The HMD can transceive data with at least one external controller 200a/200b via the wireless communication unit. Referring to FIG. 2, the HMD 100 is connected with a first external controller 200a and a second external controller 200b via the wireless communication unit to receive a control signal from the external controller 200a/200b.

In this case, the external controller 200a/200b may correspond to a sensor for experiencing virtual reality (VR) via the display unit 151. The external controller 200a/200b can be configured in various forms including a glove, a bar, a ring, and the like. According to one embodiment of the present invention, referring to FIG. 2, the external controller 200a/200b may correspond to a bar form capable of being easily handled or controlled by a user.

Although it is not depicted in FIG. 2, the external controller 200a/200b can include a sensing unit, a wireless communication unit, and a physical button.

The sensing unit of the external controller 200a/200b can include an infrared sensor, a motion tracking sensor, and the like. For example, the infrared sensor of the external controller 200a/200b senses an infrared ray emitted from the external such as a base station to identify a movement of the external controller 200a/200b moved by a user. For example, the motion tracking sensor corresponds to a sensor capable of performing 6-axis motion tracking and can include a gyro sensor, an acceleration sensor, and the like. And, the wireless communication sensor can be installed in the external controller 200a/200b to transmit movement information sensed by the external controller to the HMD main body. Meanwhile, the external controller 200a/200b can include at least one or more physical buttons. For example, the physical button can be installed in the front side, the rear side, and a side of the external controller 200a/200b.

A system according to one embodiment of the present invention (hereinafter, a HMD system) includes a HMD 100, a first external controller 200a, and a second external controller 200b. In the present invention, assume that a controller 180 included in the HMD 100 controls an external image and VR content outputted on a display unit based on movement information sensed by a plurality of external controllers 200a/200b. Besides the HMD system, a server can be separately installed. It is apparent that the server plays a role of the controller 180.

Meanwhile, in embodiments of FIGS. 3 to 11, assume that the display unit of the HMD includes a first screen and a second screen. For example, the first screen corresponds to a mains screen and can be outputted in a full screen. And, for example, the second screen corresponds to a sub screen. The second screen is positioned at the front of the first screen and can be outputted on the first screen in a manner of being overlaid. A size of the second screen can be magnified or reduced. Assume that the size of the second screen is smaller than a size of the first screen, although the size of the second screen is magnified to the max.

A screen on which an external image is outputted may change according to a movement of an external controller.

Figure 3:
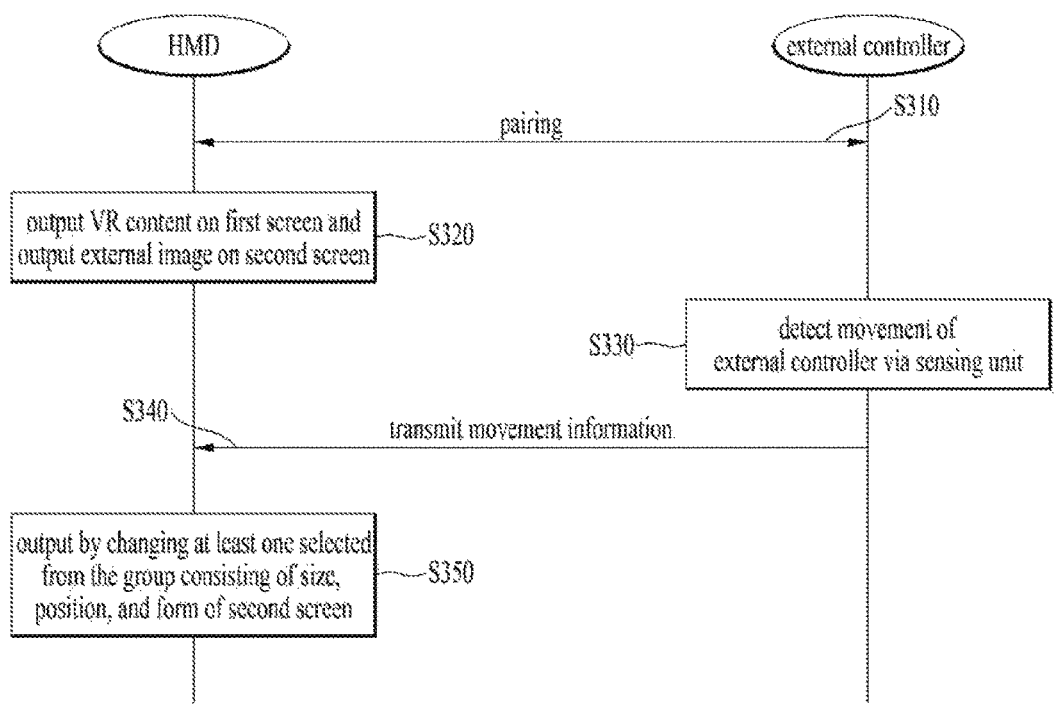
FIG. 3 is a flowchart for explaining a method of controlling a HMD system according to the present invention.

FIG. 3 is a flowchart for explaining a method of controlling a HMD system according to the present invention.

More specifically, FIG. 3 shows a data flow between a HMD and an external controller included in a HMD system.

As shown in FIG. 3, a HMD and at least one external controller are connected with each other via wired or wireless data communication [S310]. In this case, it may be able to apply WiFi-direct, BLUETOOTH technology, and the like for data pairing between the HMD and the at least one external controller.

First of all, the HMD outputs VR content on a first screen of a display unit and outputs an external image on a second screen [S320]. In this case, the VR content is outputted on the first screen first as a full screen and then the external image can be outputted on the second screen. Or, the VR content and the external image can be outputted at the same time. And, the external image may correspond to a real time image sensed by an external camera mounted on the HMD.

Subsequently, the at least one external controller can detect a movement of the external controller via a sensing unit [S330]. The movement can be detected via the motion tracking sensor mentioned earlier in FIG. 2. In this case, since the at least one external controller is in a state of being held by a hand of a user, the movement of the at least one external controller corresponds to a movement of the hand of the user.

The at least one external controller can transmit movement information to the HMD [S340]. The movement information can be transmitted to the HMD by an external controller at which the movement is sensed among the first and the second external controller.

The HMD can change and output at least one selected from the group consisting of a size, a position, and a form of the second screen on which the external image is outputted based on the received movement information [S350]. Regarding the size change or the position change of the second screen, it shall be explained with reference to FIG. 4. Regarding the form change of the second screen, it shall be explained with reference to FIG. 5.

FIG. 4 is a diagram for a method of controlling a size or a position of a second screen in a HMD system according to one embodiment of the present invention.

According to one embodiment of the present invention, a size and a position of a second screen can be determined based on a position of an external controller in a HMD system. And, an angle of view of an external camera, which is related to an external image outputted on the second screen, is fixed. The size of the second screen can be magnified or reduced according to a distance between the external controller and the HMD, i.e., between the external controller and a user, without changing the angle of view.

In an embodiment of FIG. 4, a case of controlling the second screen according to a movement of an external controller among a plurality of external controllers is explained. However, it is apparent that the second screen is also controlled according to a plurality of the external controllers.

And, VR content can be outputted on a first screen 10 which is provided to a user in a HMD system. In this case, a screen corresponding to a partial angle of view among the 360 degree VR content can be outputted on the first screen 10. In the embodiment of FIG. 4, assume that VR game content is outputted on the first screen 10. If the HMD moves left and right and top and bottom in a state of being worn on a user, the HMD can provide a VR screen of a viewing angle different from a current viewing angle among the 360 degree content according to the movement of the HMD.

Referring to FIG. 4(a), a second screen 20 is outputted on a first screen 10 with a default size. In this case, a position at which the second screen 20 is outputted may correspond to one side of an external controller 200. More specifically, when an object corresponding to an actual external controller is outputted on the first screen 10, the second screen 20 can be outputted at one side of the external controller object.

And, at least one of a position and a size of the second screen 20 can be changed based on an actual movement of the external controller 200. For example, if a direction of the external controller 200 moves in a state that a distance between the external controller 200 and the HMD 100 is maintained in a manner of being identical to a distance shown in FIG. 4(a), the position of the second screen may change on the display unit only while the size of the second screen 20 is identically maintained. And, for example, if the distance between the external controller 200 and the HMD 100 is shorter than the distance shown in FIG. 4(a), as shown in FIG. 4(b), the second screen 20 can be outputted in a manner of magnifying the size of the second screen 20.

Moreover, as shown in the embodiment of FIG. 4(b), if the size of the second screen 20 is magnified, a position at which the second screen is actually outputted becomes closer to the HMD 100 compared to the case of FIG. 4(a).

In particular, a user wearing the HMD can easily check external environment by moving the external controller held by a hand of the user. By doing so, it may be able to overcome a limit of a closed-type HMD.

Figure 5:
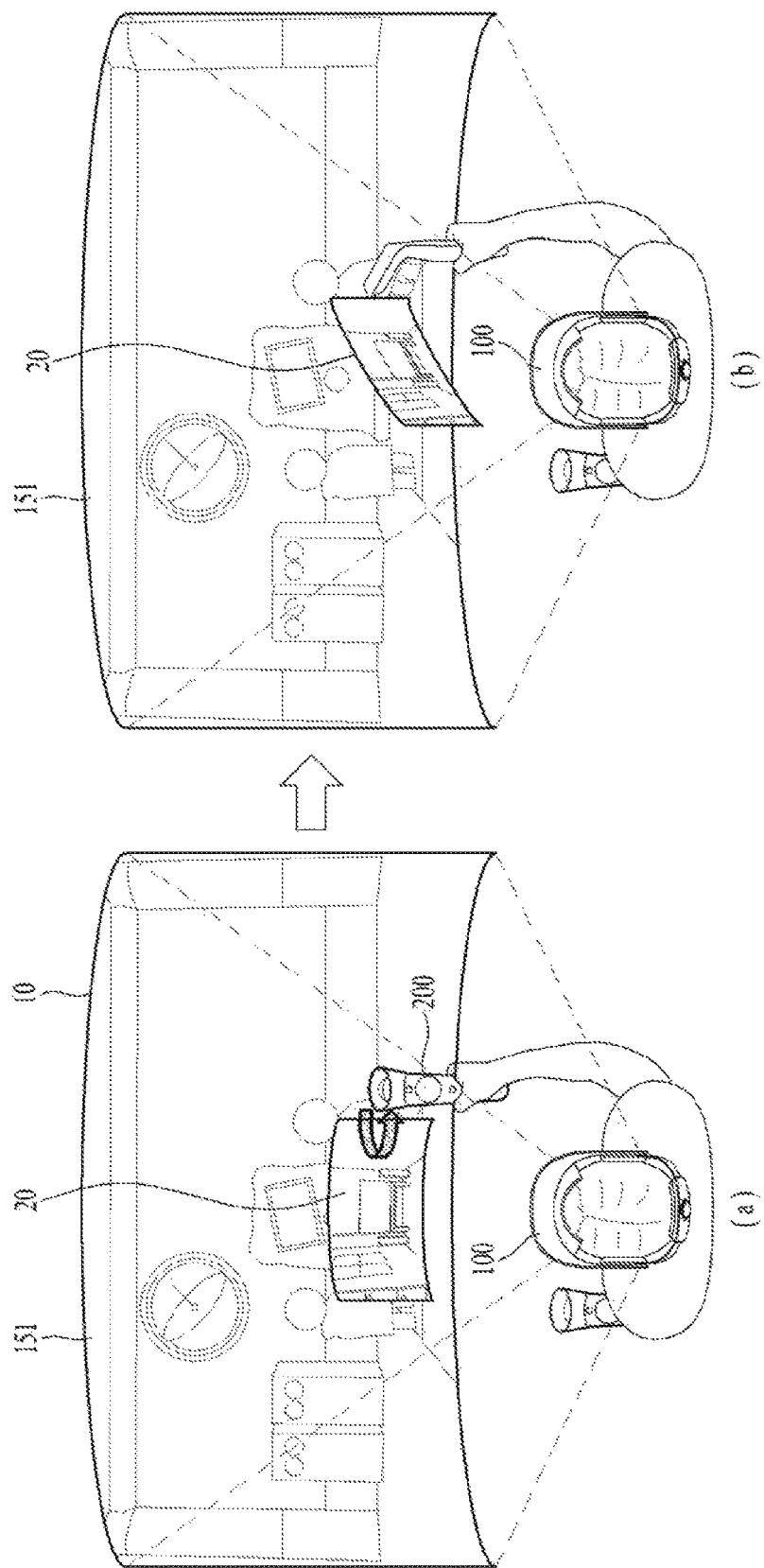
FIG. 5 is a diagram for a method of controlling an output form of a second screen in a HMD system according to one embodiment of the present invention.

FIG. 5 is a diagram for a method of controlling an output form of a second screen in a HMD system according to one embodiment of the present invention.

A case of controlling a form of a second screen according to a movement of at least one external controller among a plurality of controllers is explained in an embodiment of FIG. 5. Explanation on content overlapped with the content mentioned earlier in FIG. 4 is omitted.

According to an embodiment of FIG. 5(a), the external controller 200 can sense a rotation of the external controller in a state that the second screen 20 is outputted on the display unit with a default size. In this case, the rotation may correspond to a rotation rotating on the basis of z axis. Assume that the rotation shown in FIG. 5(a) corresponds to a rotation rotating in one direction on the basis of the z axis in a state that a positon of the external controller 200 is not changed. In this case, the external controller 200 can transmit movement information including the sensed rotation to the HMD 100.

In this case, as shown in FIG. 5(b), the HMD 100 can change a form of a PIP screen 20 based on the received movement information. More specifically, the HMD 100 can output a screen of the rotated second screen 20 according to the rotation of the external controller 200 based on the received movement information. Hence, a user is able to recognize a direction at which the external controller 200 is currently facing through the rotation direction of the second screen 20 in a state that the first screen 10 is maintained as it is.

Figure 6:
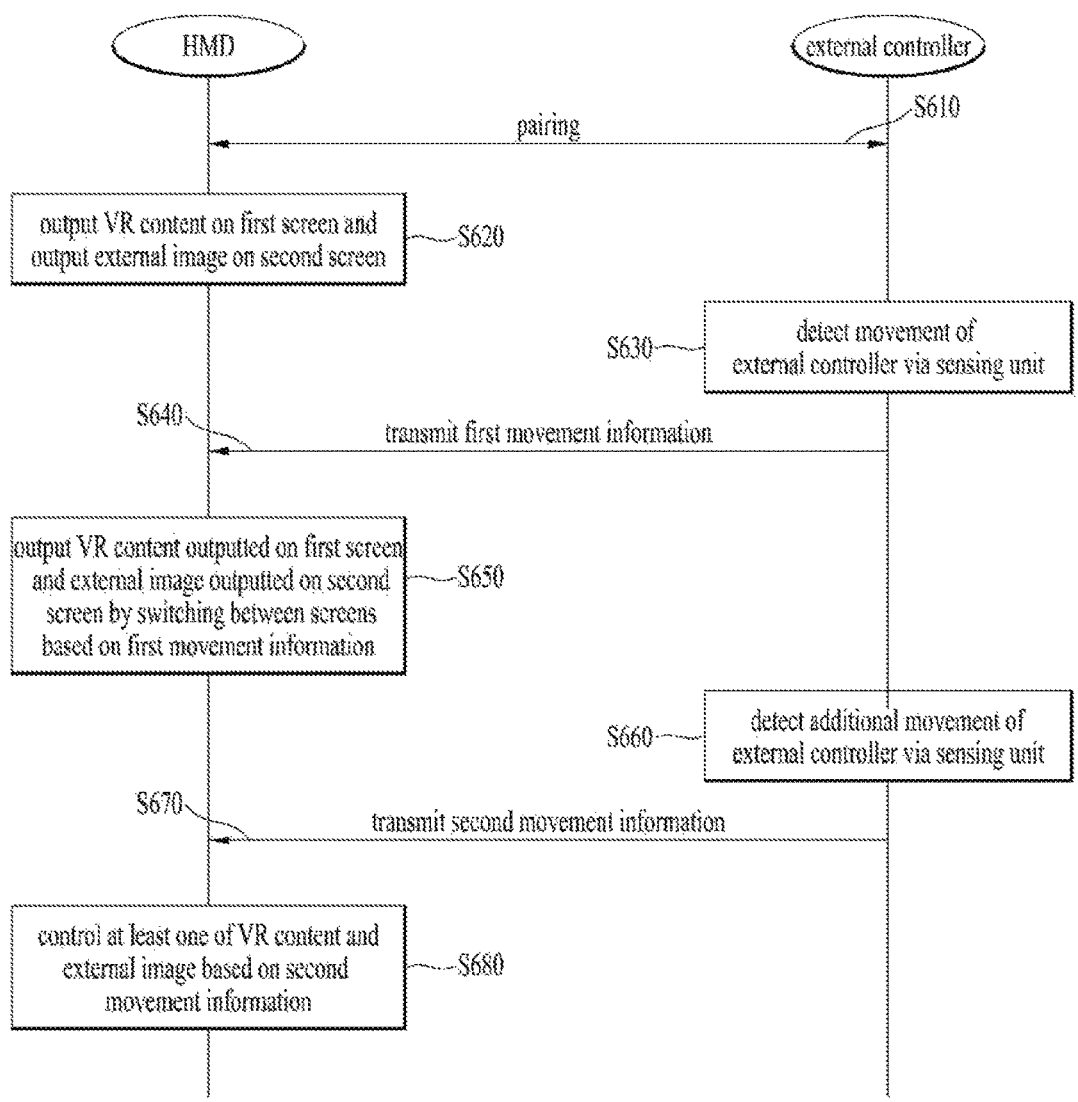
FIG. 6 is a flowchart for a method of controlling a HMD system according to one embodiment of the present invention.

Switching Between Second Screen and First Screen According to Movement of External Controller FIG. 6 is a flowchart for a method of controlling a HMD system according to one embodiment of the present invention.

More specifically, FIG. 6 shows a data flow between a HMD and an external controller included in a HMD system. Unlike the embodiment of FIG. 3, an embodiment of FIG. 6 can include not only a change of a size of the second screen but also switching of the first screen according to a movement of the external controller. In the embodiment of FIG. 6, explanation on content overlapped with the content mentioned earlier in FIG. 3 is omitted.

As shown in FIG. 6, a HMD and at least one external controller are connected with each other via wired or wireless data communication [S610]. First of all, the HMD outputs VR content on a first screen of a display unit and outputs an external image on a second screen [S620]. In this case, the display unit includes the first screen and the second screen. In this case, assume that the first screen corresponds to a screen on which content provided by the HMD is outputted and the second screen corresponds to a screen on which an external situation or environment sensed by an external camera is outputted.

Subsequently, the at least one external controller can detect a movement via a sensing unit [S630]. The at least one external controller can transmit first movement information to the HMD [S640]. In this case, the first movement information may correspond to information indicating that the at least one external controller is positioned at a screen switching area. Regarding this, it shall be explained with reference to FIG. 7.

In this case, the HMD can output the VR content outputted on the first screen and the external image outputted on the seconds screen by switching the VR content and the external image based on the first movement information [S650]. More specifically, the external environment currently outputted on the second screen is outputted in a full screen of the display unit and the content currently outputted on the first screen can be outputted on the second screen in a manner of being reduced. In particular, the HMD can control the second screen to be outputted at the front of the first screen and control the VR content to be outputted on the second screen. Regarding this, it shall be explained in detail with reference to FIG. 7.

Subsequently, the at least one external controller can detect an additional movement via the sensing unit in a state that the VR content and the external image are outputted in a manner of being switched [S660]. The at least one external controller can transmit second movement information to the HMD [S670].

In this case, the HMD can control at least one of the VR content and the external mage based on the second movement information [S680]. Regarding this, it shall be explained in detail with reference to FIGS. 8 to 10.

Figure 7A:
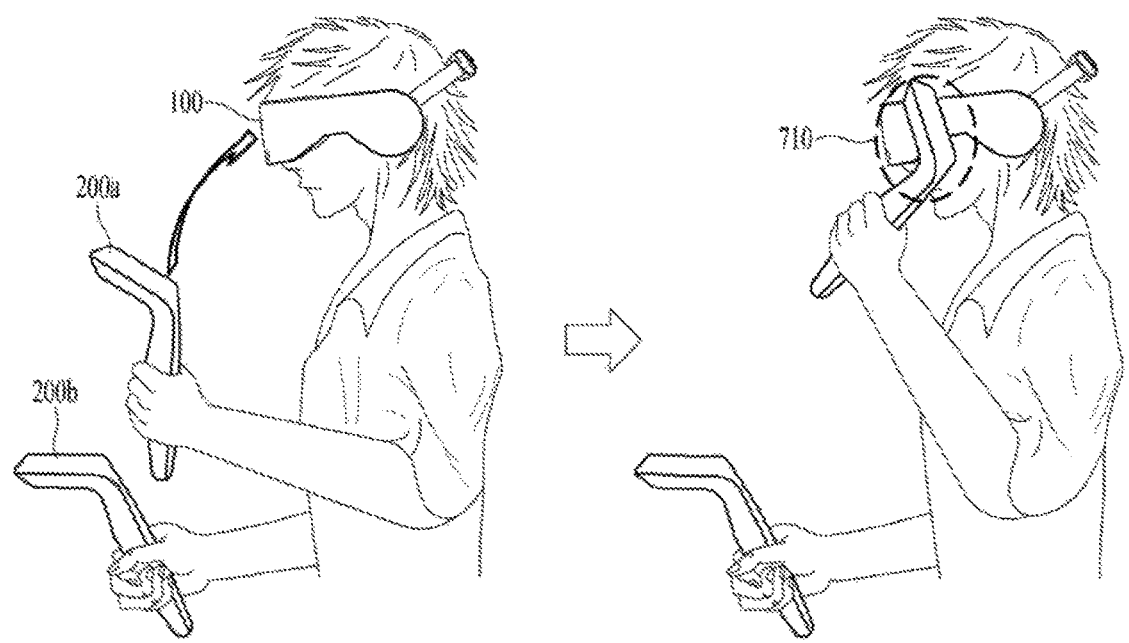

FIGS. 7A and 7B are diagrams for an example of switching between a first screen and a second screen according to a movement of an external controller in a HMD system according to one embodiment of the present invention.

More specifically, FIG. 7A shows an actual movement of the external controller in a state that a user is wearing the HMD and FIG. 7B shows a case that the actual movement of the external controller is reflected to the display unit.

Referring to FIG. 7A, a user can move a plurality of external controllers 200a/200b in a state that the user is wearing the HMD 100 and is holding a plurality of the external controllers 200a/200b by both hands. At least one of a plurality of the external controllers can be configured to control the second screen. In an embodiment of FIGS. 7A and 7B, assume that a first external controller 200a is configured to control the second screen on which an external image is outputted.

As mentioned earlier in FIG. 4, if a distance between an external controller and the HMD becomes shorter, the HMD can magnify a size of the second screen. Referring to the first drawing of FIG. 7A, the first external controller 200a moves to the HMD 100 to make a distance from the HMD to be shorter. Referring to the second drawing of FIG. 7A, the first external controller 200a can be positioned at a screen switching area 710. In this case, the screen switching area 710 corresponds to an area near the HMD 100 and an eye of a user. The screen switching area can be positioned within a predetermined distance on the basis of the HMD 100.

Whether or not the first external controller 200a is positioned at the screen switching area 710 can be determined by signal strength between the first external controller 200a and the HMD 100. Besides, whether or not the first external controller 200a is positioned at the screen switching area 710 can be sensed in various methods. And, the first external controller 200a transmits movement information to the HMD 100. Having received the movement information, the HMD 100 can recognize that the first external controller 200a is positioned at the screen switching area.

Referring to the first drawing of FIG. 7B, the HMD 100 outputs VR content on the first screen 10 of the display unit and can output an external image on the second screen 20. As the first external controller 200a is getting close to the HMD 100, as shown in the second drawing of FIG. 7B, a size of the second screen 20 can be magnified.

If the first external controller 200a is positioned at the screen switching area 710, the HMD 100 can switch between the screens outputted on the first screen 10 and the second screen 20. For example, referring to the third drawing of FIG. 7B, if the first external controller 200a is positioned at the screen switching area 710, the HMD 100 can output an external image sensed by an external camera on the first screen 10 in real time. In this case, as shown in the fourth drawing of FIG. 7B, a VR application corresponding to the content previously outputted on the first screen 10 can be executed in the background in a paused state. As a result, the first screen 10 can be outputted on the display unit only.

As a different example, although it is not depicted in FIG. 7B, if the first external controller 200a is positioned at the screen switching area 710, the HMD 100 outputs an image of external environment on the first screen 10 and may be able to output an execution screen of the VR application on the second screen.

Figure 8A:
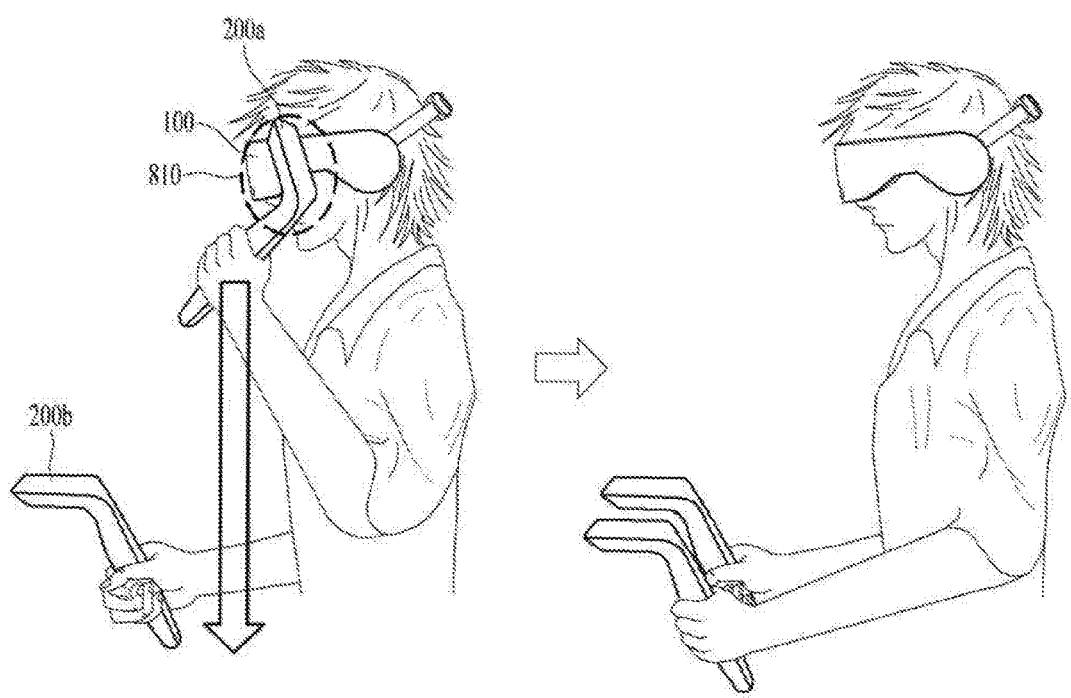

FIGS. 8A and 8B are diagrams for an example of controlling an external image, which is switched according to a movement of an external controller, in a HMD system according to one embodiment of the present invention.

More specifically, FIG. 8A shows an actual movement of the external controller in a state that a user is wearing the HMD and FIG. 8B shows a case that the actual movement of the external controller is reflected to the display unit. In the embodiment of FIGS. 8A and 8B, explanation on content overlapped with the content mentioned earlier in FIGS. 7A and 7B is omitted.

First of all, as mentioned earlier in FIG. 4, a size of the second screen 20 can be changed based on a distance between the HMD 100 and the first external controller 200a. If the first external controller arrives at the screen switching area 810, an external situation is outputted on the first screen 10 in a full screen and a user may intend to maintain a state that the external situation is outputted on the first screen 10. In this case, if the external situation is outputted on the second screen 20 instead of the first screen according to the increase of the distance between the first external controller 200a and the HMD 100, the user may feel inconvenience in using the external situation.

Referring to FIG. 8A, a user can vertically move the first external controller 200a in a down direction from the screen switching area 810 while wearing the HMD 100. Preferably, when the first external controller 200a is vertically moved from the screen switching area 810, it is not necessary to vertically move the first external controller in an exact straight line. The first external controller 200a senses a movement vertically moving in down direction and can transmit movement information to the HMD 100. Having received the movement information, the HMD 100 can recognize a state that the first external controller 200*a* has vertically moved in down direction after arriving at the screen switching area 810. In the embodiment of FIG. 8A, although an example of vertically moving the first external controller in down direction is depicted, by which the present invention may be non-limited. The first external controller may moves in a predetermined direction without describing a parabola.

Referring to the first drawing of FIG. 8B, the HMD 100 can maintain a full screen mode of an external image based on the movement information received from the first external controller 200*a* in a state of outputting the external situation on the first screen 10 of the display unit rather than an executions screen of VR content. This is aimed to provide a user with an experience identical to a situation of outputting the VR content in a full screen, although the real time external image rather than the VR content is outputted in the full screen.

And, as shown in the second drawing of FIG. 8B, the HMD 100 can provide a system menu 820 function, although an external image is outputted on the first screen 10. In particular, the HMD 100 can provide such a system menu 820 as dashboard, although external environment rather than an execution screen of VR content is outputted on the first screen 10 in a full screen.

FIGS. 9A to 9D are diagrams for an example of matching each of a plurality of external controllers to a first screen and a second screen in a HMD system according to one embodiment of the present invention.

Figure 9A:
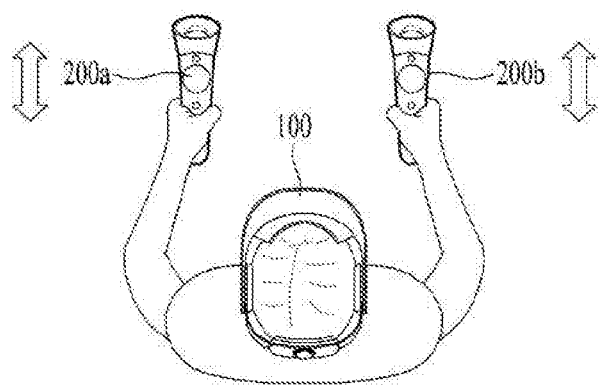
Figure 9B:
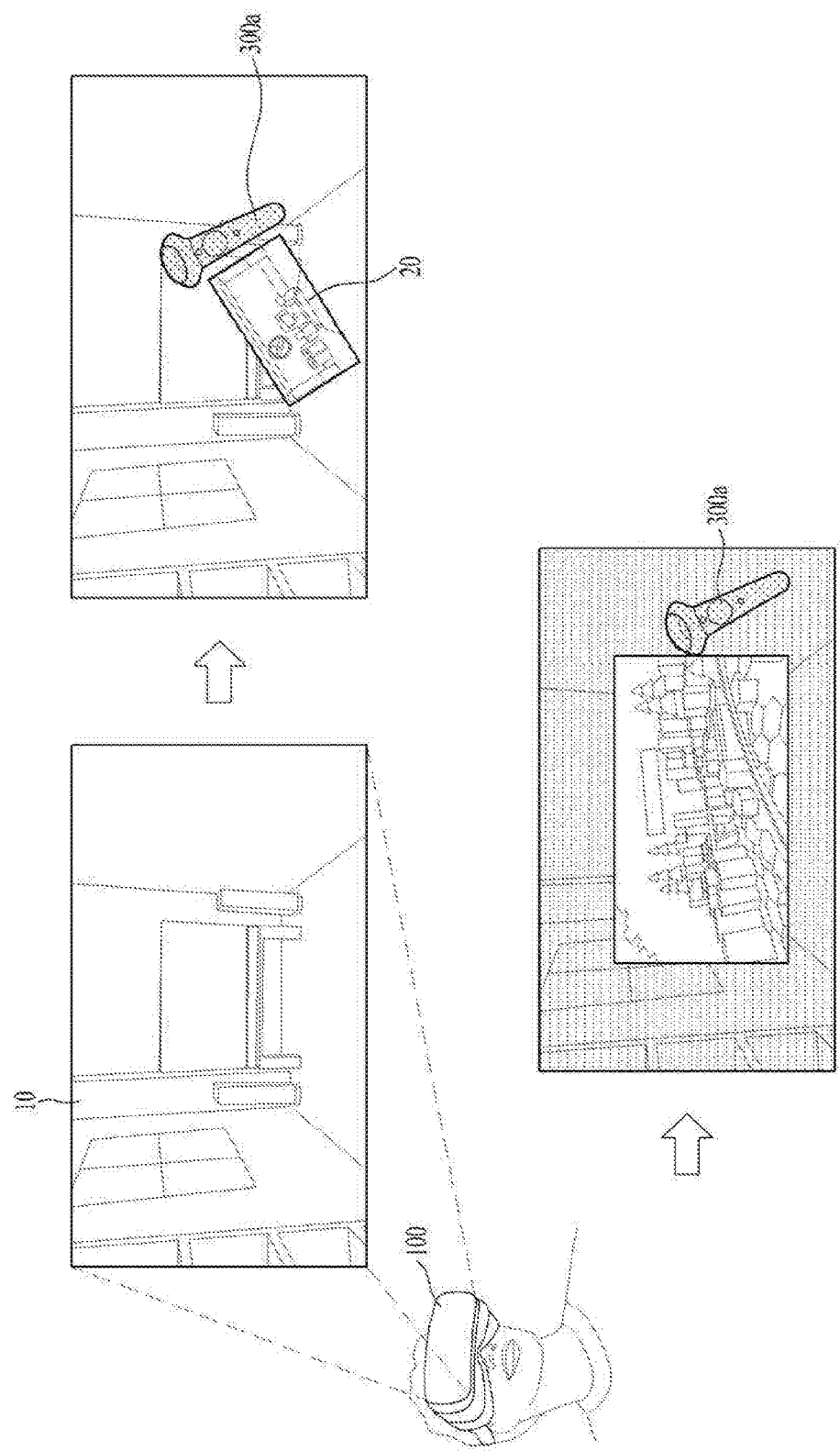
Figure 9C:
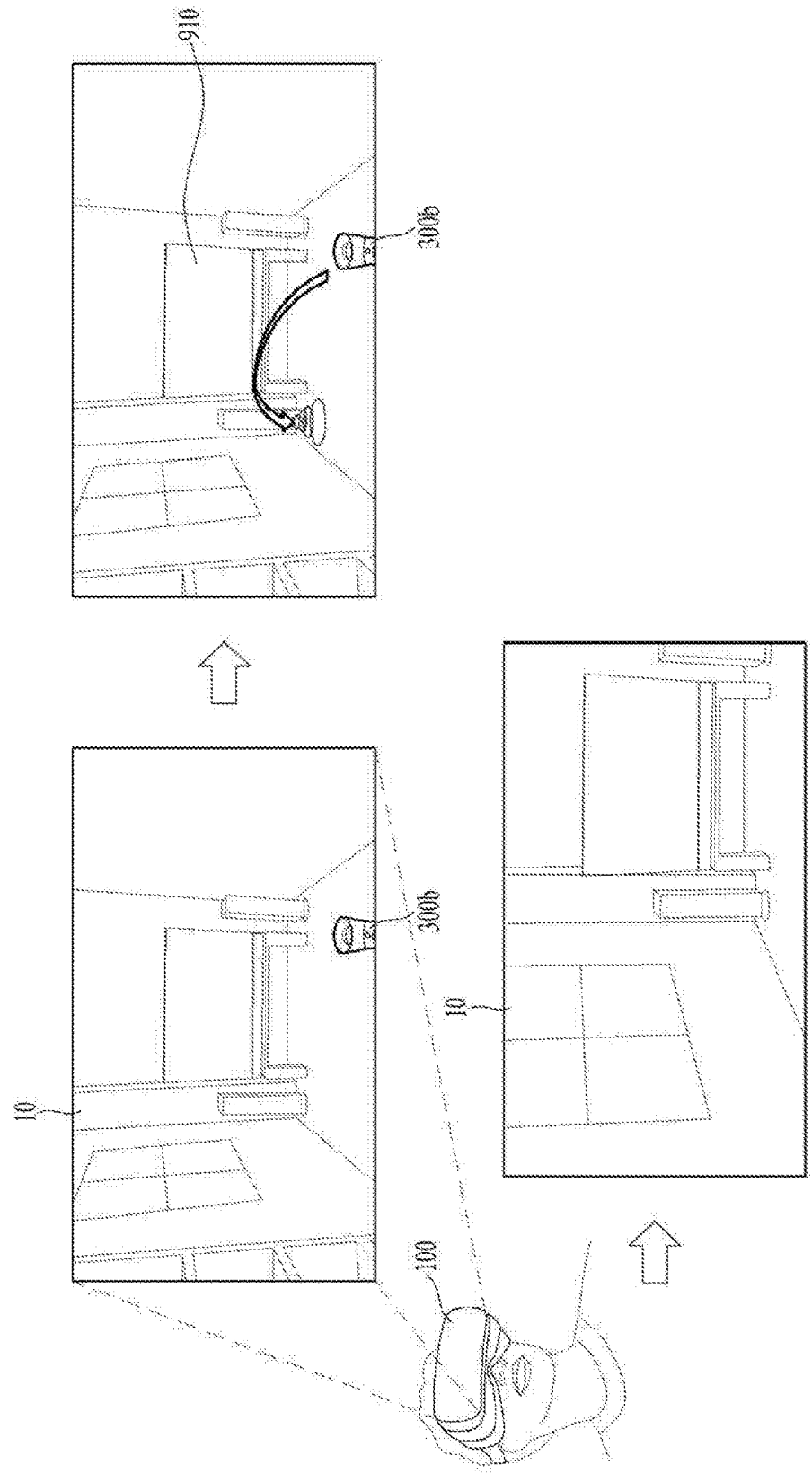

More specifically, FIG. 9A shows a state that a user is wearing the HMD 100 and a plurality of external controllers and FIGS. 9B to 9D show a case that a display unit is practically controlled by the external controllers. In an embodiment of FIGS. 9A-9D, explanation on content overlapped with the content mentioned earlier in FIG. 7 is omitted. And, in the embodiment of FIGS. 9A-9D, assume that an external image is outputted on a first screen of the display unit in a full screen.

A state shown in FIG. 9A corresponds to a state that a first or a second external controller 200*a*/200*b* has vertically moved in down direction after being positioned at a screen switching area. In this case, each of a plurality of the controllers can be configured to control the first screen or the second screen of the display unit by controlling a movement or a physical button. For example, the first external controller 200*a* can be configured to control an execution screen of VR content and the second external controller 200*b* can be configured to control the second screen, by which the present invention may be non-limited. An opposite case can also be configured.

For example, referring to FIG. 9B, an external image, i.e., a real time image of external environment can be outputted on the first screen of the display unit in a full screen. In this case, among a plurality of external controllers, a controller mapped to the first screen is positioned on the display unit and the second screen can be activated. In this case, as shown in the second drawing of FIG. 9B, the HMD 100 can control the second screen 20 to be outputted at one side of an object 300*a* corresponding to the controller. And, the HMD 100 can outputs an execution screen of VR content on the second screen 20. In the embodiment of FIG. 9B, a VR application corresponds to a game.

In this case, since the VR content is outputted on a small screen of the second screen 20, it is necessary to set a limit on a control range of a first external controller 200*a*. For example, if the VR content corresponds to such content requiring a detail control as a game application, it is impossible to control all menus by a single external controller rather than a plurality of external controllers. Hence, if the VR content corresponds to an application requiring high control, the first external controller 200*a* can be configured to control a partial function only among all functions.

And, for example, if the VR content corresponds to such content requiring a simple control as a video application, it is possible to control all menus by a single external controller. Hence, if the VR content corresponds to an application requiring low control, the first external controller 200*a* can be configured to control all functions.

Referring to the third drawing of FIG. 9B, if a distance between the HMD 100 and the first external controller 200*a* is reduced, a size of the second screen 20 can be magnified. And, if a game application outputted on the second screen 20 is mainly used, the first screen 10 can be dimly outputted to highlight the second screen 20.

As a different example, referring to FIG. 9C, an external image can be outputted on the first screen 10 of the display unit in a full screen. In this case, among a plurality of external controllers, a controller mapped to the first screen 10 can be positioned on the display unit. As shown in the first drawing of FIG. 9C, the HMD 100 can output an object 300*b* corresponding to a second external controller 200*b* on the first screen.

And, it may be able to activate a transport function via a user operation on the second external controller 200*b*. The transport function corresponds to a function for performing a space movement in a virtual space without a physical movement of a user. Yet, in FIG. 9C, the transport function corresponds to a function for performing a space movement in external environment sensed by an external camera rather than a virtual VR space without a movement of a user. In this case, as shown in the second drawing of FIG. 9C, the HMD 100 can output a transport indicator 910 on the first screen 10.

The second external controller 200*b* can sense an input inputted on a trigger button. For example, the trigger button may correspond to a physical button mounted on an external controller. The input inputted on the trigger button corresponds to an input for checking whether or not a space movement is performed in an area at which the transport indicator 910 is outputted. In this case, the second external controller 200*b* can inform the HMD 100 that the input is received on the trigger button. As shown in FIG. 9C, the HMD 100 can output an image, which is sensed on the basis of a position moved by the transport function, on the first screen 10. In this case, since the external camera mounted on the HMD 100 does not move, a part of the currently sensed image can be outputted in a manner of being cropped and magnified.

As a different example, referring to FIG. 9D, an external image can be outputted on the first screen of the display unit in a full screen. Referring to the second drawing of FIG. 9D, if a user input is inputted on a first external controller 200*a* or a second external controller 200*b*, it may enter a see-through screen mode. The see-through screen mode corresponds to a mode capable of watching a preferred part of external environment by magnifying and highlighting the part using an external camera only without a physical movement of a user.

Meanwhile, in the embodiment of FIG. 9D, assume that the first external controller 200*a* performs a function for making an external image enter a full screen mode and the second external controller 200*b* performs a function for magnifying or selecting a partial area of the first screen 10 on which the external image is outputted in the see-through mode. In the see-through mode, as shown in the second drawing of FIG. 9D, the full screen is provided in a manner of being divided by a predetermined size and a magnified area indicator 920 can be outputted.

If the second external controller 200b moves to the left or right via a physical button, as shown in the third drawing of FIG. 9D, a position of the magnified area indicator 920 can be changed. If an area is selected by the second external controller 200b, as shown in the fourth drawing of FIG. 9D, a magnified selection area 930 can be outputted in a manner of being overlaid on the full screen.

FIGS. 10A and 10B are diagrams for an example of controlling a first screen or a second screen according to a movement of an external controller in a HMD system according to one embodiment of the present invention.

More specifically, FIG. 10A shows a directional movement that a user wearing the HMD puts an external controller towards a first screen or a second screen and FIG. 10B shows a result that the control of the external controller is reflected to the display unit.

In the embodiment of FIGS. 10A and 10B, assume that the first external controller 200a controls a size and a position of the second screen 20 and the second external controller 200b controls actual contents of the first screen 10 and the second screen 20.

According to the embodiment of FIGS. 10A and 10B, the second screen 20 is outputted at one side of the first external controller 200a and an execution screen of a VR application can be outputted on the second screen 20. In this case, assume that the screens on which VR content and an external image are outputted are switched and fixed via the embodiments mentioned earlier in FIGS. 7A-8B. And, external environment sensed by an external camera (not depicted) of the HMD 100 can be outputted on the first screen 10 in real time. In this case, the second external controller 200b can be positioned at a position facing the first screen 10 or the second screen 20. And, a control target screen can be determined according to a direction of the second external controller 200b. In particular, direction information of the second external controller 200b can be transmitted to the HMD. In the embodiment of FIGS. 10A and 10B, if an external controller is positioned on the display unit, an object corresponding to the external controller is outputted.

Referring to FIG. 10A (a), a user can put the second external controller 200b towards the first screen 10. In this case, referring to FIG. 10B (a), at least one of the HMD 100 and the second external controller 200b can be connected with at least one device positioned at the front of the HMD in wired or wireless. And, the second external controller 200b can sense a control input inputted by a user while heading to the first screen 10. In this case, the HMD 100 receives information on the control input from the second external controller 200b and may be able to output a message 1020 for controlling an external device 1010 on the first screen 10. As show in FIG. 10B (a), "To turn on TV, push menu button" can be outputted as the message 1020.

Although it is not depicted in FIG. 10B, the second external controller 200b can sense an additional control input inputted on a menu button. In this case, the second external controller can transmit information on the sensed additional control input to the HMD 100. The HMD 100 or the second external controller 200b can transmit a control signal to the external device 1010 in response to the additional control input. For example, the external device (i.e., TV) 1010 can turn on the power of the TV according to the received control signal.

Referring to FIG. 10A (b), a user can put the second external controller 200b towards the second screen 10. In this case, referring to FIG. 10B (b), the second external controller 200b can sense a control input inputted by a user while an execution screen of a game application is outputted on the second screen 20. In this case, the HMD 100 receives information on the control input from the second external controller 200b and may be able to control the game application outputted on the second screen 20.

Figure 11A:
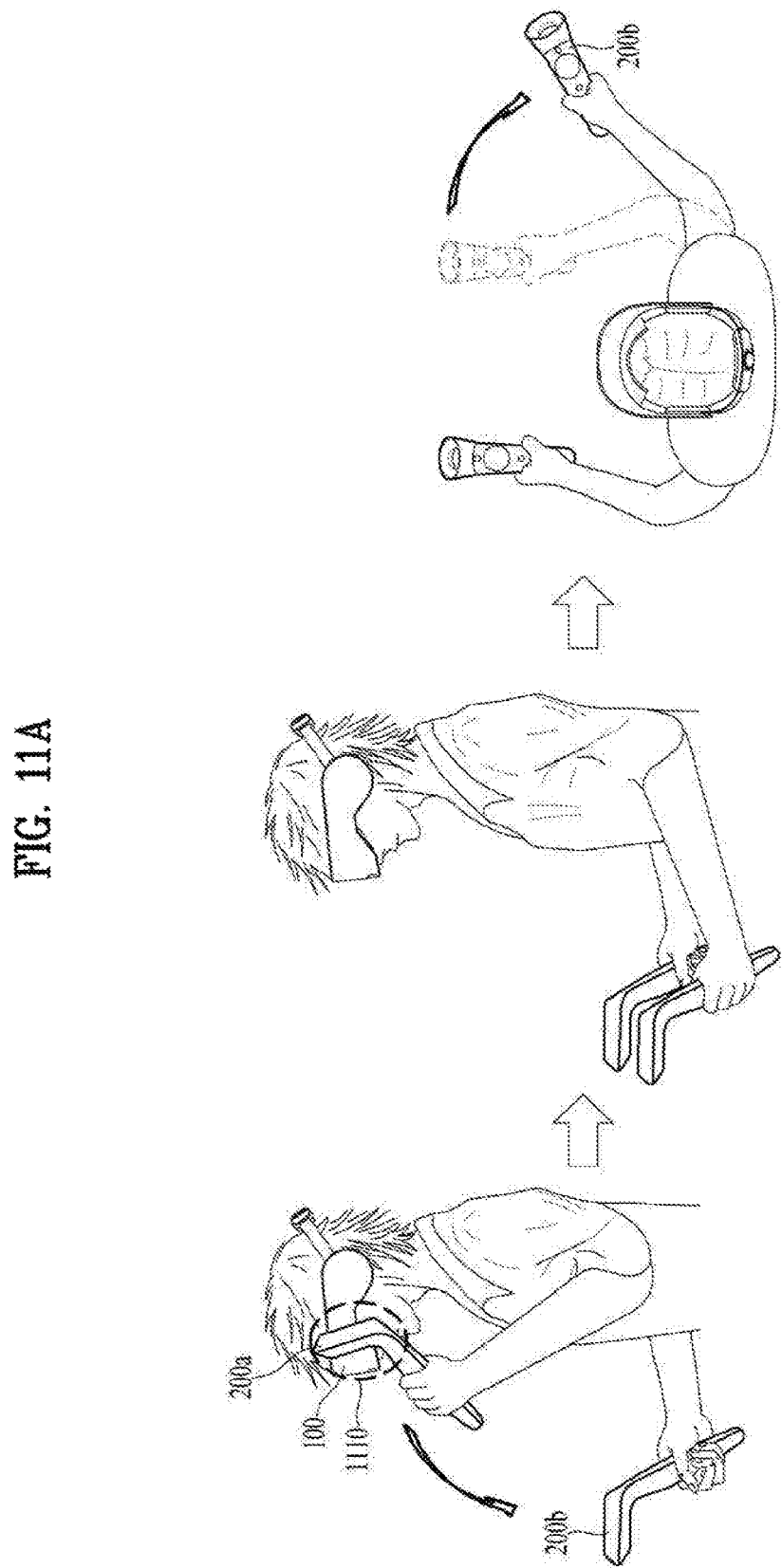
FIGS. 11A and 11B are diagrams for an example of switching between a first screen and a second screen according to a movement of an external controller in a HMD system according to one embodiment of the present invention.
Figure 11B:
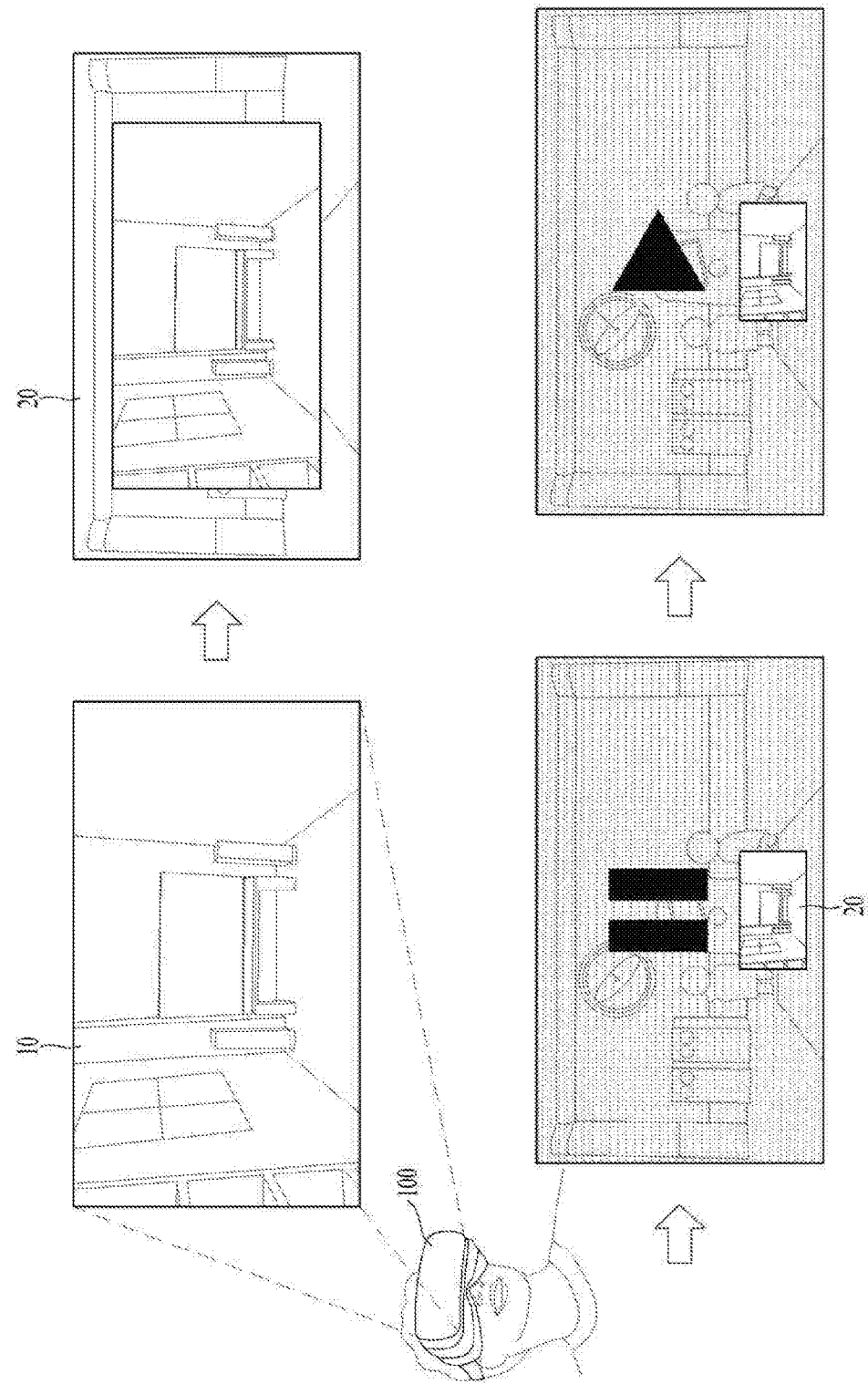

FIGS. 11A and 11B are diagrams for an example of switching between a first screen and a second screen according to a movement of an external controller in a HMD system according to one embodiment of the present invention.

More specifically, FIG. 11A shows an actual movement of an external controller while a user is wearing the HMD and FIG. 11B shows a result that the movement of the external controller is reflected to the display unit.

Referring to FIG. 11A, a user wearing the HMD 100 can move the first external controller 200a in down direction from a screen switching area 1110. In FIGS. 8A and 8B, the first external controller 200a is vertically moved in down direction from the screen switching area. However, in FIGS. 11A and 11B, a case of vertically moving the first external controller is excluded. In this case, referring to FIG. 11B, the HMD 100 cancels a full screen mode of an external image outputted on the first screen 10 based on movement information received from the first external controller 200a and can control VR content to be outputted on the first screen 10. In this case, the VR content can be outputted on the second screen 20 again.

Referring to the first to the third drawing of FIG. 11B, the external image is outputted on the second screen 20 according to the movement of the first external controller 200a and the VR content is outputted on the first screen 10. In particular, the HMD is switched to a default state. In this case, a VR application can be outputted in paused state.

Subsequently, a user may intend to activate the VR application in the paused state again. For example, referring to the third drawing of FIG. 11A, the user can move the second external controller 200b at which the second screen is outputted in a direction. In this case, the direction may correspond to an outward direction. As a different example, although it is not depicted in FIG. 11A, the user can move the second external controller 200b to an area where the second screen is not outputted on the display unit. As a further different example, although it is not depicted in FIG. 11A, the user can perform an operation of shaking the second external controller 200b side to side. Besides, the user can activate the VR application via various movements.

The second external controller 200b can transmit sensed movement information to the HMD 100 according to the aforementioned examples. And, as shown in the fourth drawing of FIG. 11B, the HMD 100 can activate the VR application again based on the received movement information to cancel the paused state.

According to at least one embodiment of the present invention, it is able to control not only a screen on which VR content is outputted but also a screen on which a real time external image is outputted by operating an external controller connected with the HMD.

According to at least one embodiment of the present invention, it is able to provide a real time external image rather than VR content on the display unit of the HMD in a full screen.

Moreover, for clarity, although each drawing is explained in a manner of being divided, embodiments described for each drawing can be combined with each other to implement a new embodiment.

A system including a HMD and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A head mounted display (HMD) system, comprising:
   at least one external controller comprising:
      a first wireless communication unit configured to transceive data with a HMD; and
      a sensing unit configured to detect movement of the at least one external controller; and
   the HMD comprising:
      a display;
      a camera;
      a second wireless communication unit configured to transceive data with the at least one external controller; and
      a controller configured to:
         cause the display to display virtual reality (VR) content on a first screen of the display;
         cause the display to display an external image received via the camera on a second screen of the display;
         receive first movement information from the at least one external controller via the second wireless communication unit; and
         cause the display to display the external image previously displayed on the second screen on the first screen based on the first movement information,
      wherein the first movement information indicates that the at least one external controller is positioned at a screen switching area,
      wherein the screen switching area corresponds to an area near the HMD and an eye of user wearing the HMD, and is positioned within a predetermined distance on the basis of the HMD.

2. The HMD system of claim 1, wherein the controller is further configured to cause the display to display the VR content previously displayed on the first screen on the second screen based on the first movement information.

3. The HMD system of claim 1, wherein the controller is further configured to: receive second movement information from the at least one external controller via the second wireless communication unit, wherein the second movement information corresponds to information indicating that the at least one external controller moves in a first direction after being positioned at the screen switching area; and maintain a state of displaying the external image on the first screen based on the second movement information.

4. The HMD system of claim 3, wherein the controller is further configured to:
   receive third movement information from the at least one external controller via the second wireless communication unit, wherein the third movement information corresponds to information indicating that the at least one external controller moves in a second direction after being positioned at the screen switching area; and
   cause the display to re-display the VR content on the first screen based on the third movement information.

5. The HMD system of claim 4, wherein the controller is further configured to:
   receive fourth movement information from the at least one external controller via the second wireless communication unit; and
   control at least one of the VR content or the external image based on the fourth movement information.

6. The HMD system of claim 5, wherein the fourth movement information comprises direction information indicating that the at least one external controller is facing the first screen or the second screen.

7. The HMD system of claim 6, wherein the controller is further configured to control the at least one external device based on the fourth movement information when the at least one external controller is facing the first screen.

8. The HMD system of claim 1, wherein the at least one external controller comprises a first external controller and a second external controller.

9. The HMD system of claim 8, wherein the controller is further configured to:
   map the first external controller to control the VR content; and
   map the second external controller to control the external image.

10. The HMD system of claim 1, wherein the controller is further configured to cause the display to output the second screen at one side of an object corresponding to the at least one external controller displayed on the display.

11. The HMD system of claim 1, wherein the controller is further configured to cause the display to display a real time external image received via the camera on the second screen.

12. The HMD system of claim 1, wherein the controller is further configured to perform a pairing with the at least one external controller via the second wireless communication unit.

13. The HMD system of claim 1, wherein the controller is further configured to:
receive second movement information from the at least one external controller via the second wireless communication unit; and
change at least a size, a position, or a form of the second screen on which the external image is displayed based on the second movement information, causing the display to output the changed second screen.

14. The HMD system of claim 13, wherein the controller is further configured to:
output the second screen by magnifying the size of the second screen when the second movement information indicates that a distance between the at least one external controller and the HMD is decreasing; and
output the second screen by reducing the size of the second screen when the second movement information indicates that the distance between the at least one external controller and the HMD is increasing.

15. The HMD system of claim 14, wherein an angle of a view of the external image displayed on the second screen is uniformly maintained.

16. The HMD system of claim 1, wherein a size of the first screen is greater than a size of the second screen.

17. The HMD system of claim 1, wherein:
the second screen is displayed in a manner of being overlaid on the first screen; and
the second screen is displayed at a closer distance compared to the first screen on the basis of the HMD.

18. A head mounted display (HMD), comprising:
a display;
a camera;
a wireless communication unit configured to transceive data with at least one external controller; and
a controller configured to:
cause the display to display virtual reality (VR) content on a first screen of the display;
cause the display to display an external image received via the camera on a second screen of the display;
receive movement information from the at least one external controller via the wireless communication unit; and
cause the display to display the external image previously displayed on the second screen on the first screen based on the movement information,
wherein the movement information indicates that the controller is positioned at a screen switching area,
wherein the screen switching area corresponds to an area near the HMD and an eye of user wearing the HMD, and is positioned within a predetermined distance on the basis of the HMD.

19. A method of controlling a head mounted display (HMD) system comprising a head mounted display (HMD) and at least one external controller, comprising:
displaying virtual reality (VR) content on a first screen of a display of the HMD;
displaying an external image received via a camera on a second screen of the display;
sensing movement of the at least one external controller via a sensing unit of the at least one external controller;
transmitting movement information to the HMD via a wireless communication unit of the at least one external controller based on the sensed movement;
receiving the movement information from the at least one external controller via a wireless communication unit of the HMD; and
displaying the external image previously displayed on the second screen on the first screen based on the movement information,
wherein the movement information indicates that the at least one external controller is positioned at a screen switching area,
wherein the screen switching area corresponds to an area near the HMD and an eye of user wearing the HMD, and is positioned within a predetermined distance on the basis of the HMD.

* * * * *